United States Patent
Iseli et al.

(10) Patent No.: US 10,962,361 B2
(45) Date of Patent: Mar. 30, 2021

(54) MACHINE GEOMETRY MONITORING

(71) Applicant: HEXAGON TECHNOLOGY CENTER GMBH, Heerbrugg (CH)

(72) Inventors: Claudio Iseli, Au (CH); Johan Stigwall, St. Gallen (CH); Thomas Jensen, Rorschach (CH); Frank Przygodda, Lindau (DE)

(73) Assignee: HEXAGON TECHNOLOGY CENTER GMBH, Heerbrugg (CH)

( * ) Notice: Subject to any disclaimer, the term of this patent is extended or adjusted under 35 U.S.C. 154(b) by 209 days.

(21) Appl. No.: 16/200,418

(22) Filed: Nov. 26, 2018

(65) Prior Publication Data
US 2019/0195626 A1   Jun. 27, 2019

(30) Foreign Application Priority Data
Dec. 21, 2017   (EP) .................................... 17209643

(51) Int. Cl.
*G01B 21/04* (2006.01)
*G06T 1/00* (2006.01)
(Continued)

(52) U.S. Cl.
CPC ........... *G01B 21/042* (2013.01); *G01B 5/008* (2013.01); *G01B 5/0014* (2013.01);
(Continued)

(58) Field of Classification Search
CPC ...... G01B 21/042; G01B 5/008; G01B 7/008; G01B 11/005; G01B 11/08
(Continued)

(56) References Cited

U.S. PATENT DOCUMENTS 4,901,256 A * 2/1990 McMurtry ............. G01B 7/008
33/503
5,604,593 A   2/1997 McMurtry
(Continued)

FOREIGN PATENT DOCUMENTS

CN   101432592 A   5/2009
CN   105277148 A   1/2016
(Continued)

OTHER PUBLICATIONS

European Search Report dated Apr. 6, 2018 as received in Application No. 17 20 9643.

*Primary Examiner* — Christopher W Fulton
(74) *Attorney, Agent, or Firm* — Maschoff Brennan

(57) ABSTRACT

A machine state monitoring system for recurrently determining a change in static or dynamic properties of a geometry of a machine with positional encoders to derive a coordinate information of at least a first machine portion with respect to a second machine portion, which are movable with respect to one another. The monitoring system includes one calibration-monitoring-unit with an optical, at least two-dimensional measuring location sensing unit which is fixed to the first machine portion and configured to optically sense an at least two dimensional location information of an artifact which is provided at the second machine portion, and temporarily moved into a sensing range for determining the change in the static or dynamic properties of the geometry of the machine by a comparison of multiple of such sensings, the compensation parameters are then updated and is used to derive the coordinate information from the encoders.

15 Claims, 7 Drawing Sheets

(51) Int. Cl.
  *G01B 5/008* (2006.01)
  *G01B 5/00* (2006.01)
  *G06K 9/62* (2006.01)
  *G01B 11/24* (2006.01)

(52) U.S. Cl.
  CPC .......... *G06K 9/6289* (2013.01); *G06T 1/0014* (2013.01); *G01B 11/2433* (2013.01); *G06K 2209/19* (2013.01)

(58) Field of Classification Search
  USPC .................................................... 33/502, 503
  See application file for complete search history.

(56) References Cited

U.S. PATENT DOCUMENTS

| | | | |
|---|---|---|---|
| 5,850,081 A | 12/1998 | Yanagisawa | |
| 6,112,423 A * | 9/2000 | Sheehan | G01B 21/042 |
| | | | 33/502 |
| 7,810,248 B2 | 10/2010 | McMurtry | |
| 7,841,097 B2 | 11/2010 | Evans et al. | |
| 2009/0141131 A1* | 6/2009 | Arai | G01B 11/30 |
| | | | 348/187 |
| 2009/0307915 A1 | 12/2009 | Sutherland | |
| 2010/0286812 A1 | 11/2010 | Slettemoen et al. | |
| 2012/0017453 A1* | 1/2012 | Ogihara | G01B 21/045 |
| | | | 33/503 |
| 2012/0246953 A1* | 10/2012 | Engel | G01B 21/045 |
| | | | 33/502 |
| 2014/0157610 A1* | 6/2014 | Garvey | G05B 19/401 |
| | | | 33/503 |
| 2014/0259715 A1* | 9/2014 | Engel | G01B 7/008 |
| | | | 33/503 |
| 2016/0018218 A1 | 1/2016 | Nakagawa et al. | |
| 2016/0071272 A1* | 3/2016 | Gordon | G01B 11/245 |
| | | | 348/48 |
| 2016/0131470 A1 | 5/2016 | Ishikawa et al. | |
| 2016/0138911 A1 | 5/2016 | Wallace et al. | |
| 2016/0146589 A1* | 5/2016 | Jonas | G01B 21/045 |
| | | | 33/503 |
| 2016/0178362 A1 | 6/2016 | Iseli et al. | |
| 2016/0223316 A1 | 8/2016 | Jordil et al. | |
| 2017/0010094 A1 | 1/2017 | Iseli et al. | |
| 2017/0082416 A1 | 3/2017 | Besuchet et al. | |
| 2017/0299366 A1 | 10/2017 | Kanbe et al. | |
| 2017/0370690 A1* | 12/2017 | Held | G01B 21/042 |
| 2019/0107378 A1* | 4/2019 | Meile | G01B 5/008 |
| 2019/0187661 A1* | 6/2019 | Yanaka | G01B 9/02072 |
| 2020/0049498 A1* | 2/2020 | Rees | G01B 21/045 |

FOREIGN PATENT DOCUMENTS

| | | |
|---|---|---|
| CN | 105473981 A | 4/2016 |
| CN | 105588533 A | 5/2016 |
| CN | 105716559 A | 6/2016 |
| CN | 105793666 A | 7/2016 |
| CN | 105841576 A | 8/2016 |
| CN | 107303644 A | 10/2017 |
| DE | 10 2015 205 566 A1 | 9/2016 |
| EP | 1 322 905 B1 | 3/2005 |
| EP | 2 705 935 A1 | 3/2014 |
| WO | 95/020747 A1 | 8/1995 |
| WO | 2015/082935 A1 | 6/2015 |

* cited by examiner

MACHINE GEOMETRY MONITORING

CROSS-REFERENCE TO RELATED APPLICATIONS

This application claims priority to European Patent Application No. 17209643.9, filed on Dec. 21, 2017. The foregoing patent application are incorporated herein by reference.

FIELD OF INVENTION

The present invention relates generally to a system or method for monitoring a machine geometry, respectively of sensing deviations in geometric properties of a machine during the machines usage, calibration monitoring units and computer programs.

BACKGROUND

Machines often require precise positioning of a machine portion with respect to another, for example coordinate measurement machines (herein also abbreviated as CMM) are often industrially used to measure geometrical features of objects. Therein the demanded accuracy is often rather high, e.g. in the range of micrometers or below. To achieve such, the CMMs are often built rigidly or quasi rigid, with high resolution positional encoders to accurately determine a position of a measurement probe at a probe head, which is moved around the object in at least one, preferably three or more degrees of freedom, for a contacting (=touch)—but in some embodiments also contactless—geometrical measurement. Preferably there are drive units for moving the probe head in multiple axes. The CMM also comprises or is connected to a programmable computation-unit and/or a controller which is evaluating the geometrical measurements and optionally to automatically move the measurement head according to a measurement program.

A machine in sense of the present invention can be any kind of CMM, like e.g. a CMM embodied as cartesian, cantilever, bridge-type, gantry, scara, Hexapod, Tripod, antropomorphic robot, horizontal arms, articulated arm or romer arm, with parallel kinematics and/or delta-kinematics, preferably with linear and/or turning drives and encoders. Examples can be found in EP 2 705 935, U.S. Pat. Nos. 7,841,097, 7,810,248, WO 1995/020747, U.S. Pat. No. 5,604,593, EP 1 322 905, WO 2015/082935, etc. A machine in sense of the present invention can further also be a surface scanning device or a form- or shape-measurement device. Also a machine tool or a similar processing machine can be an embodiment of a machine in the sense of the present invention, in particular but not only when equipped or equippable with a measurement probe.

To achieve the desired high accuracy, a machine has to be calibrated regularly. Such is known to be done by probing or scanning a solid, highly accurate and well known reference object with the measurement probe, e.g. by one or more stylus(es) equipped with a ruby-ball to touch the reference objects surface. For improved accuracy, such can be done multiple times and/or at different locations within the measurement volume of the machine, whereby a kind of calibration-map of the machine can be derived by extensive calculations.

Still, environmental effects like inhomogeneous temperature distribution within the frame of a machine, other environmental influences like humidity, sunlight or draught, wear of the machine or of the measurement probe, drifts, mechanical deformations, or even putting a work-piece (weight) on the granite-plate of the machine, distort the machines geometry and thus the way the machine travels along some degree of freedom. Also hysteresis effects, e.g. from Harness, etc. can have impact. Such can therefore also influence the absolute accuracy and performance of the machine.

BRIEF DESCRIPTION OF THE INVENTION

It is therefore an object of some embodiments to improve a machine, in particular to improve or verify its accuracy. Compensating environmental effects in real-time and/or periodically could be provided. In particular between a machine-base where a to work on object is mounted and thereto moved machine portion, like a measuring sensor mounted at a machines probe head which will also used for object measurements. Especially non-repeating and/or non regular effects like drifts, deformations, etc. should be compensated for.

Especially if measurements have to be performed inline in a process chain on a shop floor, the environment can be quite harsh and more error prone than in dedicated, air-conditioned and specifically designed measurement facilities. In order to achieve accurate measurements, the machine needs to monitor for influences from the environment such as temperature fluctuations, etc. and react upon them. Although temperatures can be measured, their actual effect on the overall machine geometry can not always be predicted accurately from those temperature values alone. Many of those deviations are non-reproducible or non-reversible repeatable long term effects, due to climate changes, machine or environmental load conditions, settlement, wear, etc.

It is also an object of some embodiments to provide a way to achieve such quickly. As said, it is known practice to calibrate a machine by sampling one or more reference balls, but such is time consuming and burdensome and not practical to be done often, in particular not in a shop floor environment. It can therefore be a particular aspect to achieve such an accuracy enhancement or check quicker than a reference ball scan, preferably a single measurement shot and not by a plurality of successive measurements.

Part of the object can also be that an inline inspection of the machine should be provided, preferably in-between or during measurements. It is often desired to regularly monitor for such long term drifts, preferably by a quick and accurate check, which preferably can be fully automated and included into measurement software. Advantageously, one or more single shot measurements should be enough to derive a drift-condition of the machine, preferably with an accuracy below one micrometer.

It can also be a further enhancing object to use an actual measurement probe—which will also be used for object measurements during work—also for this compensation. This avoids a time consuming probe tip exchange and provides the additional possibility to verify the correctness of the measurement probe itself.

Those objects are achieved by realizing the features of the independent claims. Features which further develop the invention in an alternative or advantageous manner are described in the dependent patent claims.

According to some embodiments of the present invention, those objects are solved by providing a device and/or method at a machine with a simple global and preferably absolute sensing to derive deviations in geometric machine properties for moved machine portions, in particular to take into account temperature, inhomogeneous and other drift-effects and shape deviations in the working volume. In other words, a monitoring of deviations, in particular such with large time constant e.g. in the order of multiple minutes, hours or even days, weeks or months is provided by the present invention. Such a low frequency global surveillance system to monitor non-repeatable effects at low frequency within the machine according to the invention allows minimizing or overcoming those effects.

According to some embodiments of the invention, the machine periodically—or triggered by some event as described below—moves to one or more certain position(s) and holds this position while an optical system fixed at the machine observes an artifact, e.g. a measurement artifact of a measurement probe stylus at a measurement tool of a CMM. The results can e.g. be an identified center point location of the artifact with respect to scales or encoder values of the machine. Those center point or other artifact shape and/or location information with respect to the machines base can then e.g. be compared to previous measurements, whereby deviations, drifts, etc. can be evaluated. Based on this calibration or compensation parameters, statistical values, confidence levels, etc can be derived and applied to the coordinate measurement values taken by the machines encoders. Such an applying of compensations to the coordinate values can be done subsequently, retrospectively and/or by a time interpolation in-between multiple deviations. The result of those recurrent low frequency drift measurements can be used to map, re-map or correct the geometric mapping of the machine or respectively to correct or parameterize a modeling, a black-box model, a look up table or the like.

According to some embodiments of the invention, a special calibration monitoring-unit can be attached to a portion of the machine, comprising at least one optical sensor, preferably an optical sensor capable of light position evaluation, and also comprising at least one optical illumination source.

In other words, the present invention therefore relates to a machine state monitoring system, in particular a machine geometry monitoring system, for recurrently determining a change and/or deviation in properties of a geometry of the machine, in particular of static and/or dynamic properties of a geometry of a machine.

A change and/or deviation can e.g. mean a monitoring or deriving of information regarding a change in between two different sensing and/or a deviation from a previous value or from a desired nominal value, which can in particular involve a calculation of a difference in-between at least two sensing, preferably with a modeling of the sensing to link them to physical properties of the machine, in particular properties of the machine's geometry.

Static and/or dynamic properties of the geometry of the machine, or static and/or dynamic related properties of the geometry of the machine, can e.g. be expressed in other words to relate to characteristics which are influencing the geometric shape of the machine or of a basic mechanical frame structure of the machine and/or the geometry of the movements of the machines portions with respect to one another. Those characteristics can be substantially static properties, like plastic deformations, temperature strain, wear, etc. which are static, which means e.g. that they tend to be rather stable in a short time view but tend to vary in a long term view like over many hours, weeks or years, and can often be derived by one single time measurements. Those characteristics can also be substantially dynamic properties, like elastic deformations, bending, inertial effects, resonances, reactions on external strain, etc., which are dynamic, which means e.g. that they tend to be dependent on time and/or other external factors like stimulation or strain, in particular which dependency has to be considered in the sensing, and can often be derived by a temporal sequence of multiple measurements within a given time frame, in which temporal sequence dynamic changes of the sensed values over time (or strain, stress, force, etc.) are evaluated to derive a dynamic property. The properties of the geometry can therein be used to model or parameterize such characteristics e.g. by a set of parameters which are reflecting those physical changes or deviations in the machine's geometry.

In particular a monitoring of the machine for long-term or quasi-static changes or deviations, like e.g. drift, stability, wear or other issue. Preferably such is done by a quick, preferably single-shot sensing or measurement, which is done often, preferably also during or in-between the work process of the machine.

The machine is therein configured with positional encoders to derive a coordinate information of at least a first machine portion with respect to a second machine portion, which machine portions are movable with respect to one another by a motorized drive unit, e.g. linear and/or rotational in one or more dimensions. The machine is therein in particular configured to move a machine portion along a desired or defined trajectory. The machine can for example be a measurement machine and/or machine tool, in particular various variants of a coordinate measurement machine (CMM) or a computer numerical control (CNC) machine like a late and/or milling center or a robotic arm.

According to some embodiments of the invention, the monitoring system comprises at least one calibration-monitoring-unit with an optical, at least two-dimensional measuring location sensing unit. In some embodiments also a three-dimensional measuring location sensing unit or even more dimensional sensing unit can be comprised. The sensing of those dimensions is therein preferably done substantially simultaneous e.g. in a single measurement shot and not sequential.

The calibration-monitoring-unit is fixed to the first machine portion and configured to optically sense an at least two dimensional location information of an artifact which is provided at the second machine portion. In particular the calibration-monitoring-unit can be configured to optically sense during minimum one time instance an at least two dimensional location information of at least one artifact that is provided at the second machine portion. Optionally also more than one artifact at the same or at different locations at the second machine portion (or also at further machine portions) can be sensed. This optical sensing can in particular be done when at least the involved machine portions are standing still, or in other words without significant movements of the first and second machine portions while the location information of an artifact is sensed. In particular there is no significant relative movement of the at least one artifact with respect to the calibration monitoring unit and also no significant movement of the calibration monitoring unit with respect to the first machine portion to which it is attached—in other words, the sensing setup comprising the second machine portion with its artifact and also the first machine portion with its location sensing unit are, at least substantially, stationary during the (rather short) period of time which is required for the sensing. For the sensing, the artifact is temporarily moved into a sensing range of the calibration-monitoring-unit for determining any change and/or deviation, in particular recurrently or repeatedly, at multiple times in the course of and/or in-between the regular working process or operation of the machine. Therein the change and/or deviation can be derived by a comparison of multiple of such sensings.

In particular, the artifact is moved into a sensing range of the calibration-monitoring-unit for a certain period of time which is required to derive the at least two dimensional location information. In other words, by the calibration-monitoring-unit, at least two degrees of freedom, preferably three or more, can be evaluated in a single measurement acquisition. Preferably, there are no subsequent measurement acquisitions of each of the dimensions one after the other as well as no multiple individual discrete measurements for each of the dimensions.

The recurrently determining can e.g. be done at times in-between measurements, at a tool-change event, at an environmental event (like temperature-change, barometric change, hydroscopic change, sunshine impact, etc.). It can also be done at multiple scheduled calibration checking times throughout the working of the machine, by shortly moving the artifact to the calibration-monitoring-unit, doing a single shot measuring, and returning back to work.

The determining of the change and/or deviation of the static and/or dynamic properties of the geometry of the machine can therein be recurrently established in the course of a regular operation of the machine at multiple single time instances and/or during multiple time sequences in which time sequences multiple location information are sensed and evaluated over time to derive dynamic properties.

Therein, the monitoring system can be configured to monitor the change in the static and/or dynamic properties of the geometry of the machine and to update compensation parameters of a model or map of the geometry of the machine, which model or map is used to derive the coordinate information from the (raw) encoder readings. A deviation in geometric properties of a machine can then be derived based on the location information and the coordinate information, preferably comprising a machine-model and a history of previous recurrent sensings or determinations.

The calibration-monitoring-unit can therein be rigidly and permanently mounted at a fixed calibration-position at the first machine portion.

Expressed otherwise, one or more calibration-monitoring-units are affixed to the first machine portion and configured to optically measure a location information of an artifact at the second machine portion with respect to the first machine portion in at least two-dimensions. The calibration-monitoring-units are linked to a numerical compensation unit, which is configured to determine a position deviation relative to the second machine portion based on the optically sensed location information from the calibration-monitoring-unit. The numerical compensation unit can therein be configured to derive compensation parameters for the geometric machine deviations and/or to provide and/or to apply the compensation parameters to the coordinate information from the positional encoders.

Or expressed the other way round, an artifact is provided at the second machine portion, in particular either fixed or temporarily exchangeable, and a calibration-monitoring-unit of the monitoring system is fixed to the first machine portion. The calibration-monitoring-unit is therein configured to optically sense an at least two dimensional location information of the artifact, when the artifact is brought within a measuring range of the calibration-monitoring-unit.

The calibration-monitoring-unit can be linked to a numerical compensation unit which is configured to derive the deviation in geometric properties of the machine based on a divergence in-between at least a first of the optical sensing of the location information of the artifact and at least one posterior second of the optical sensing of the location information of the artifact. The calibration-monitoring-unit can therein in particular be configured to provide and/or to apply a numerical compensation of the determined geometry-influencing properties to the coordinate information from the encoders of the machine. The determined deviation in geometric properties can for example also be represented in a machine-map, machine-model, black-box, neural network, etc., which is applied to the coordinate information from the encoders to at least partially compensate the deviations and/or to calculate statistical parameters or define a confidence-interval for the coordinate information.

The machine can in particular be a surface or form scanning machine, a Coordinate Measurement Machine CMM or a machine tool. Such a machine can in particular comprise a machine-base as the first machine portion and a machine head as the second machine portion, for example with a measurement probe head at the second machine portion, which is movable in at least three degrees of freedom with respect to the machine-base by the motorized drive unit. Such a measurement probe head can in particular be embodied as a CMM measurement head with a, preferably exchangeable, measurement tool, e.g. with a tactile measurement stylus mounted. A portion of this measurement probe head or of the measurement stylus can be the artifact used for the location information sensing. In particular the tactile measurement artifact of the measurement stylus, like a ruby or ceramic sphere or ball can be used as artifact according to the invention. Such a measurement probe or measurement stylus can be embodied to be at least partially exchangeable, e.g. manually or by an automatic tool exchanger.

In some embodiments, also more than one location sensing units can be fixed at different locations at the first machine portion, which can be evaluated in combination by the calibration-monitoring-unit. There can also be more than one artifacts, which can be fixed at the same or at different locations at the second machine portion, or optionally also at further machine portions. The calibration-monitoring-unit will then be configured to derive the static and/or dynamic properties of the geometry of the machine with respect to the respective locations of the location sensing units and/or artifacts at the machine.

The calibration-monitoring-unit can in preferably comprise at least one light source for emitting optical radiation or light which is impinging the artifact, in particular a semiconductor light source like an LED or a laser diode, a fluorescent lamp, or a electroluminescence-foil or an OLED, and at least one photosensitive sensor to optically sense the optical radiation affected by the artifact, in particular a position dependent photosensitive sensor like a CCD- or CMOS image sensor, a position sensitive device (PSD), a photodiode, a single photon avalanche diode (SPAD), a Bi-cell, a device based on the lateral photo effect or a quadrature photodiode detector.

The calibration monitoring unit can in particular be embodied as a rigid, one piece monitor unit, preferably without movable parts or portions. In a special embodiment it can be made at least partially of athermal material, such as Zerodur.

The light source can be configured in such a way that the artifact is actively light emitting. For example, with a coupling of optical radiation from the light source into the artifact and/or by a fluorescent material at the artifact, e.g. at the artifacts surface.

The calibration-monitoring-unit can also comprise at least one optical fiber for the light emission and/or light sensing, in particular wherein a coupling ratio in-between two optical fibers can be evaluated for determining the location information of the artifact.

The calibration-monitoring-unit can be built to optical sense or survey the artifact based on a positional light intensity profile derived by the photosensitive sensor, which sensor is arranged at a side of the artifact which is substantially opposite to the side of the light source. In particular such a setup can comprise at least one of:
- an optically intransparent artifact projecting a shape of the artifact onto the photosensitive sensor, in particular at least intransparent with respect to the light source characteristics, e.g. in view of wavelength polarization, etc.;
- a shading of light from the light source by the artifact, which shading is sensed, and in particular located, by the photosensitive sensor;
- an absorption of light from the light source by the artifact, which adsorption is sensed in its intensity by the photosensitive sensor;
- an optically refractive artifact resulting in a focusing light from the light source by the artifact, focusing which is sensed by the photosensitive sensor;
- a holographic artifact resulting in a holographic projection of light provided by the light source which is sensed by the photosensitive sensor.

The calibration-monitoring-unit can also be built to optical survey the artifact based on a positional light intensity profile derived by the photosensitive sensor which is arranged at substantially the same side of the artifact at which the light source is arranged. In particular such a setup can comprise at least one of:
- a reflective artifact providing a reflection of the light from the light source, which reflection is sensed, and preferably located, by the photosensitive sensor;
- a retro-reflecting artifact, in particular embodied as a Luneburg-Lense, providing a retro-reflection of the light from the light source which retro-reflection is sensed, and preferably located, by the photosensitive sensor;
- a holographic artifact resulting in a holographic reflection of the light provided by the light source which is sensed by the photosensitive sensor;
- an interferometrical measurement unit directed towards the artifact, configured for determining one or more distances to the artifact;
- a speckle observation unit detecting a speckle pattern on the artifact, which are resulting with a coherent light provided by the light source;
- an artifact which at least partially diffuse backscatters the light from the light source.

In an embodiment, the calibration-monitoring-unit can comprise a location sensing unit which is configured to derive the location information in at least three dimensions, for example the sensing can comprise a determination of two lateral locations and of a scaling of the artifact. By such a sensing of a lateral location of a reproduction of the artifact on a sensor, two dimensional shifts can be derived and a third (in particular substantially orthogonal thereto) can be derives from a size or dimension scaling of the reproduction of the artifact at the sensor.

In another embodiment, the calibration-monitoring-unit can therein comprise a stiffness measurement unit, configured with at least one of:
- at least one quasi rigid end stop at the calibration-monitoring-unit to be touched by the artifact, wherein the quasi rigid end stop comprises a force sensor for deriving a force-value in-between the quasi rigid end stop and the artifact;
- at least one quasi rigid end stop at the calibration-monitoring-unit to be touched by the artifact, wherein the artifact comprises a force sensor for deriving a force-value in-between the quasi rigid end stop and the artifact, wherein e.g. an active tactile probe configured to sensing a force and/or a deflection of its measurement stylus which can form the artifact which touches a rigid portion of the calibration-monitoring-unit during its location information measurement;
- an actively movable end stop at the calibration-monitoring-unit to generate defined force value onto the artifact during the measurement sensing of the location information.

Such a stiffness measurement unit can gather static information of the system and using this information for modifying a probe compensation matrix and/or system model of the machine. The force value and the location information can therein preferably be derived (sensed and measured) at the same time. The direction of the force value can sequently be applied in more than one directions, for example positively and negatively in two orthogonal directions and optionally also in another, preferably thereto orthogonal, direction.

In an embodiment the quasi rigid end stop can also be transparent for the optical measurement, or hidden behind the artifact in measurement position.

In an embodiment, at the same calibration-monitoring-unit, the stiffness measurement can be established combined with the location information sensing or each can be established independent of the other. For example, by establishing or avoiding contact with the end stops, either a stiffness or a location information can be sensed, e.g. by moving the artifact to different locations within the sensing range of the same calibration-monitoring-unit.

In a specific embodiment, the invention can relate to a Coordinate Measurement Machine (CMM) long term deviations monitoring system for determining long term deviations in the geometry of the CMM. The CMM can therein in particular be embodied as a Hexapod-, Delta-, Bridge-, Horizontal arm-, articulated arm-, Scara-, Gantry-, Portal-, Cantilever- or otherwise constructed CMM. The CMM can also be embodied as a surface scanning instrument or a form or shape measurement instrument, but can also relate to machine tools which are providing a measurement probe head for geometrical measurements. The monitoring system according to the invention is in particular to monitor non-repetitive long term effects such as deviations by temperature, climate, settling, static load or wear of the CMM.

The CMM comprises a CMM-base and a measurement head being positionable in at least two or three degrees of freedom with respect to the CMM-base by a motorized drive unit. The measurement head has a measurement probe with a measurement stylus mounted, preferably wherein the measurement head, the measurement probe and/or the measurement stylus is exchangeable. The measurement stylus can in particular be a tactile measurement stylus, like touch-trigger or a touch-scanning probe. The CMM also has positional encoders to derive coordinate information of a measurement stylus position. By this coordinate information, measurement coordinates at a target object which is to be measured by the CMM can be derived.

According to some embodiments of the invention, the CMM comprises a calibration-monitoring-unit as discussed before, in particular rigidly and durable, affixed to the base of the CMM, respectively to a portion of the base to which the object to be measured will be applied. The calibration-monitoring-unit or local long term deviations and drift sensor is configured to optically survey the measurement stylus with respect to the base of the CMM, which is preferably done without physical contact of the measurement stylus and the calibration-monitoring-unit.

It also comprises a numerical compensation unit configured to determine a location or absolute position of the measurement stylus surveyed by the calibration-unit, and to derive compensation parameters for the long term deviations to be canceled or at least reduced in their effect on a measurement accuracy of the CMM. Such compensation parameters can e.g. also constitute or update a model of the CMM, which model is used in deriving or compensating the measurement results.

The resulting compensation parameters can be provided to measurement controller which is deriving measurement coordinates of the object to be measured or can be directly applied to the measurement coordinates of the object by the numerical compensation unit to result in corrected measurement coordinates of the object. In other words, a mapping of the CMM in its actual state can be established.

The measurement stylus can comprise a tactile measurement artifact, in particular a sphere or ball—like a ruby- or ceramic-ball.

Some embodiments of the invention also relate to an according method for monitoring changes and/or deviations in static and/or dynamic properties of a machine geometry as discussed above, in particular for monitoring deviations in geometric properties of a machine. In particular the machine comprises a first machine portion and a second machine portion which are positionable with respect to one another, preferably in at least two or three degrees of freedom, by a motorized drive unit. Positional encoders are provided at the machine for deriving a coordinate information of the first machine portion with respect to the second machine portion. Therein, the first machine portion comprises a calibration monitoring unit fixed to it and the second machine portion comprises an artifact.

According to some embodiments the invention, in particular recurrently, for example during a work progress of the machine or a work progress of the machine intermitting, a positioning of the artifact at a defined monitoring position at the calibration monitoring unit is done. There, an optical sensing of a location information of the artifact in at least two dimensions is done. Base on this follows a deriving of the deviations in the geometry of the machine by comparing the location information with at least one prior or preceding location information, which had been derived in one or more former positionings and sensings. The method can also involve an updating of compensation parameters of a model or map of the geometry of the machine, which model or map utilized or applied to derive the coordinate information from the encoders raw data readings, which updating is done according to the derived static and/or dynamic properties of the machine geometry.

Accordingly the method can also comprise a deriving of thereby corrected coordinate information.

The sensing of the multiple dimensions is preferably established substantially simultaneously, especially by a single measurement shot of the artifact by the calibration monitoring unit. The deriving of the compensation parameters for the deviations in the geometric properties of the machine can also comprise a comparing of the location information of the calibration monitoring unit and the coordinate information of the encoders.

The method can comprise a using of historical location information, optionally also together with additional historical information like temperature information to enhance a model used to calculate the parameters. Therefore, the invention can comprise a storing of the location information, preferably together with a time-stamp and additional environmental information.

Thereby a histogram of location information, preferably with corresponding compensation data, which comprises references to corresponding coordinate information of position encoder of the machine can be stored. With a comparing of the location information to a previously stored location a deviation value can be derived and the compensation parameters can be deduced there from.

In particular, an interpolating of the compensation data from the histogram to the actually surveyed location can be comprised in the deriving of compensation parameters for canceling out the deviations in the geometric properties of the machine in the coordinate information which is derived by the encoders. For example, the method can also comprise an applying of the derived the compensation parameters to the coordinate measurement values derived by the CMM, resulting in corrected coordinate measurement values.

The method according to the invention can be executed inline during the work progress of the machine, e.g. at run time of the machine by shortly interrupting its work. For example periodically, according to a schedule or triggered by an event (e.g. an event of an environmental sensor value change or of a measurement object or tool exchange) the intermitting monitoring can be done while the machine works.

Besides the sensing of the location information, also a sensing of a shape of the artifact can be established, which shape can be comprised in deriving of compensation parameters.

The optical sensing can also be combined with dynamic movements of the artifact to identify dynamic properties of the machine such as parameters related to weight distribution, inertia, stiffness, damping, play, backlash, dynamics, etc. Thereby, dynamically relevant compensation parameters for dynamic compensation strategies can be deduced.

In a specific embodiment of the method according to the invention, an applying of a defined or measured force to the artifact, which is located within a sensing range of the calibration monitoring unit, is established. Thereupon a deriving of geometric, static and/or dynamic properties of the machine can be established, e.g. by evaluating the location information synchronously with the force. Thereby, in particular an evaluating of a static and/or dynamic stiffness and or rigidity as a dynamic property of the machine can be established.

In another specific embodiment of the method according to the invention, a dynamically moving the artifact within a sensing range of the calibration monitoring unit can be executed, e.g. by the driving units, preferably a defined desired dynamical movement, e.g. a sinusoidal movement certain frequency. Thereupon a deriving of dynamic properties of the machine can be established by sensing a sequence of location information during the dynamical movement of the artifact and by comparing the desired dynamical movement with the sensed sequence of location information.

In a specific embodiment, the invention also relates to a method for monitoring long term deviations in the geometry of a Coordinate Measurement Machine (CMM), in particular with a CMM as specified above.

According to one aspect of the invention the method comprises a positioning of the measurement probe at a defined monitoring position of the CMM, at with a calibration monitoring unit is affixed to the CMM-base. In particular such can be done multiple times and/or at multiple different monitoring positions of the CMM.

At the calibration monitoring unit, an optically surveying of the measurement stylus is done by determination of a location of the measurement stylus with respect to the CMM-base. Thereupon a deriving of compensation parameters for a long term deviation of the CMM geometry is established by comparing the location with at least one preceding location data.

The method, or at least those parts of it which involve computation and/or calculation, can also be embodied as one or more computer program products which are stored on a machine readable medium or embodied as electromagnetic wave (such as e.g. a wired or wireless data signal). Consequently, the invention further relates to such a monitoring of deviations in geometric properties of a machine with movable machine portions according to the invention, respectively to a computer program product comprising program code for a compensation of positional encoder coordinate information based on those deviations in geometric properties.

The computer program can be executed in a calibration monitoring unit according to the invention, which calibration monitoring unit therefore also involves a computation means or numerical controller built to run a computer program providing the functionality according to the invention, with or without the computer program actually loaded.

DETAILED DESCRIPTION OF THE DRAWINGS

Units, methods and systems according to the invention are described or explained in more detail below, purely by way of example, with reference to working examples shown schematically in the drawing. Specifically, FIG. 1a, FIG. 1b, FIG. 1c, FIG. 1d are showing some examples of embodiments of a machine according to the invention;

DETAILED DESCRIPTION

The diagrams of the figures should not be considered as being drawn to scale. Where appropriate, the same reference signs are used for the same features or for features with similar functionalities. Different indices to reference signs are used to differentiate between different embodiments of the same or an equivalent feature that is shown exemplary. The term "substantially" is herein used to describe the fact that that a certain value, arrangement or feature does not necessarily need to be 100% exact, but can maybe slightly aberrate, while still being within scope. In other words, there can be some slight deviations, e.g. due to inaccuracies, unintentional, design considerations, tolerances, etc.—but there is a clear tendency towards the mentioned value or arrangement, in particular in view of the technical effect to be achieved therewith. Especially, it is not meant to be an obvious opposite. In any case, besides the meaning of "almost exactly" the term "substantially" can always be interpreted to comprise or also express the meaning of "exactly", or of the particular feature itself. The term "quasi" is used to express that some feature is apparently as expressed, but not really needs to be a 100% strictly as expressed. For example every physical body, even when a skilled person colloquially considers it to be e.g. rigid, can also suffer some—although rather small—flexure, bending, deviations, etc. Such consideration can in general be applied to almost any of the mentioned features, but it is sometimes also explicitly expressed for some of the potentially most critical features.

FIG. 1a to FIG. 1d is each showing an example of an embodiment of a machine 1 according to the invention. The shown examples can be embodied as coordinate measurement machines (CMM) or as surface scanning device or a form- or shape-measurement device, but also as a machine tool or a similar processing machine, a laser cutter, a 3D-printer, etc. Such a machine tool can therein also be equipped with a measurement probe as tool.

Figure 1A:
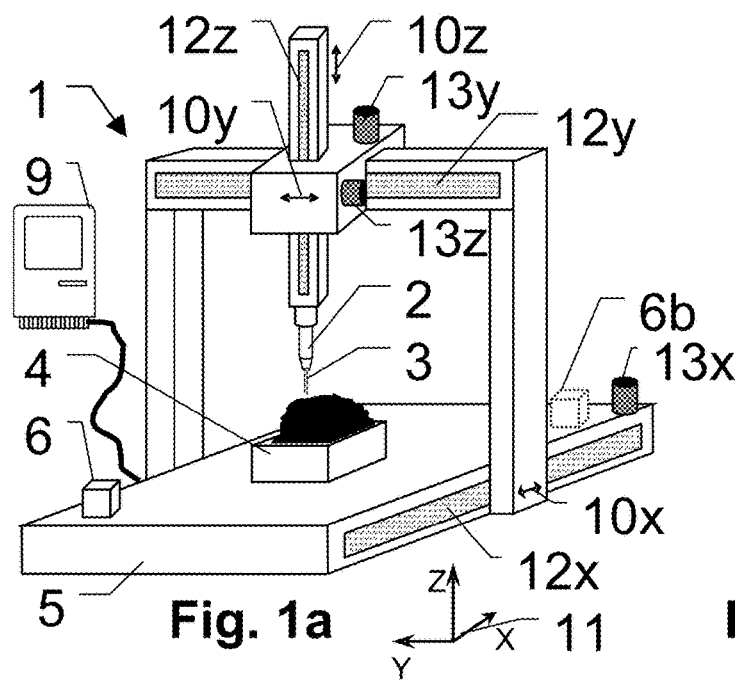

The embodiment in FIG. 1a exemplarily illustrates a portal CMM or a portal machine tool. It has a first machine portion 5, as the base 5, on which an object 4 to be worked resp. measured is placed, and a second machine portion 2, e.g. the probe head 2 which is movable with respect to the base 5. The probe head 2 has a, preferably exchangeable, measurement probe stylus 3 attached. The probe head 2 is movable in at least two or in at least three degrees of freedom, in this example in the $10x$, $10y$ and $10z$ directions or axes. In each of the axes, a corresponding positional encoder $12x$, $12y$ and $12z$ provides positional information of the probe head 2, e.g. in the here shown Cartesian coordinate system 11. Preferably the positioning can be done automatically, e.g. according to movement or measurement program, by the corresponding drive units $13x$, $13y$, $13z$. According to the invention, the machine 1 comprises a calibration monitoring system 6, built for a monitoring of deviations in the geometry of the machine, in particular of long term deviations like drifts, deformations due to environmental influences or wear, weight of the object 4 or probe-head 2 or probe 3, etc.

Figure 1B:
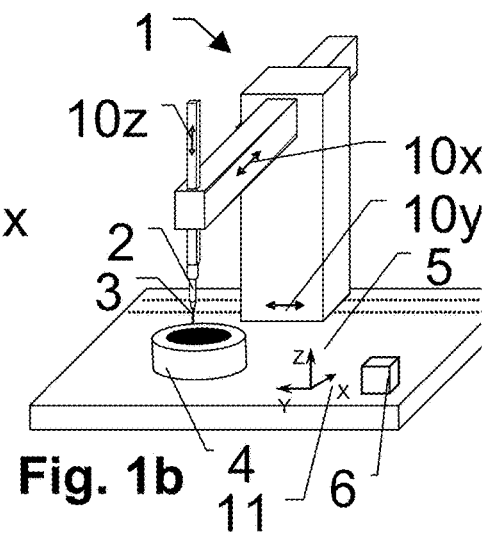

The example in FIG. 1b illustrates an embodiment of another machine 1 design. It again has axes 10x, 10y and 10z for positioning the head 2, which his here also shown as a measurement head with the measurement probe 3 attached. The coordinate information measurements in the coordinate system 11 are derived from position encoders at those axes 10x, 10y and 10z, which can preferably be motor-driven but could also be manually guided by an operator. The coordinate information can e.g. be used to measure or survey geometrical features of the object 4 placed on the machine base 5. Again there is a calibration monitoring system 6 according to the invention at the base 5, which will be discussed in detail later.

Figure 1C:
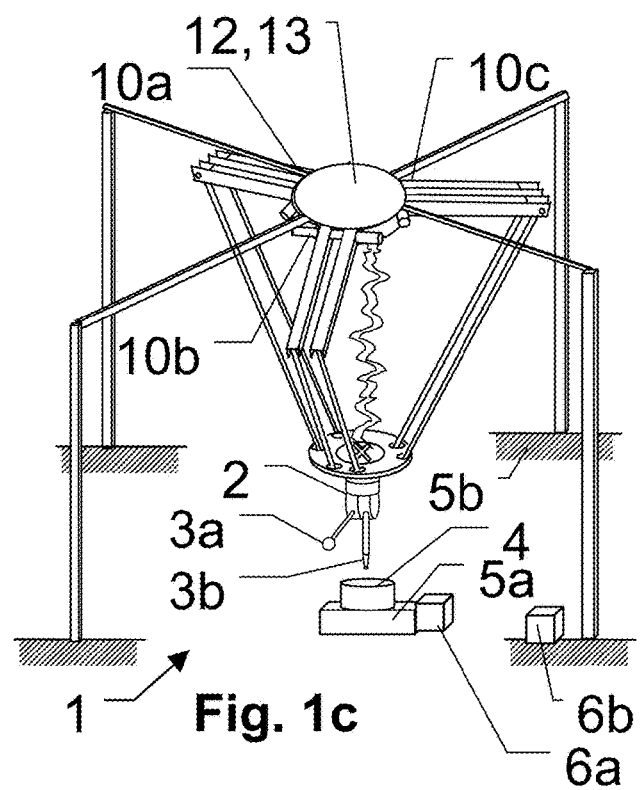
Figure 1D:
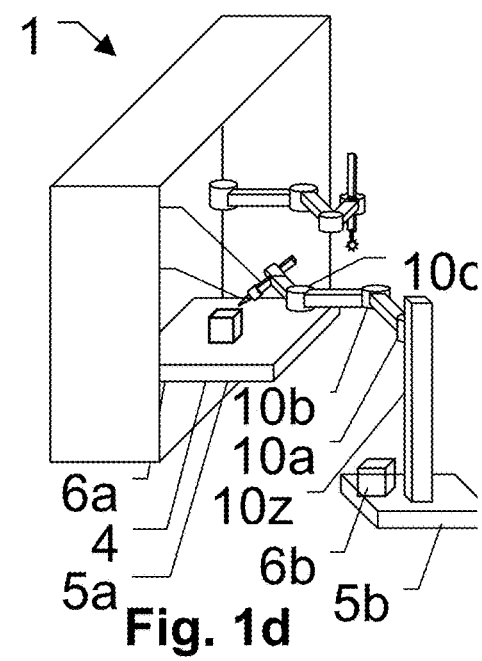

The example in FIG. 1c illustrates an exemplary embodiment of another design of a machine 1. It uses a non-Cartesian geometry with at least three axis 10a, 10b and 10c for positioning the head 2 with the tool or measurement probe 3a/3b in the machines working volume, again with corresponding drives 13 and position measurement systems 12. There are also other geometries than the one exemplary shown to achieve such. Fixed—or movable in a known or measured manner—with respect to the base 5 of the machine, the object 4 to be measured is mounted. There is also at least one calibration monitoring system 6 according to the invention. For example, the calibration monitoring system 6a can be at the base 5b of the machine frame and/or the calibration monitoring system 6b can be at the base 5b of the measurement object 4 mount.

The example in FIG. 1c shows yet another exemplary embodiment of another machine 1 setup. It uses a non-Cartesian geometry with at least five axis 10z, 10a, 10b, 10c and 10d for positioning a second portion 2 of the machine 1 relative to a first machine portion 5, with here not shown corresponding position information measurement systems 12 and drive units 13. The second machine portion 2 can e.g. be equipped with an artifact 3, which can e.g. be embodied as a measurement probe 3 tip that is used for measuring the object 4, or another kind of artifact as discussed further below. One of more calibration monitoring system 6a,6b according to the invention can be fixedly and rigidly located within the machines working volume at a base 5b of the machine and/or at a base 5a of the object 4, in particular if those bases 5a/5b are separated. Preferably, a base structure of the calibration monitoring unit 6 according to the invention can be embodied into the base 5 of the machine 1. The calibration monitoring unit 6 can also at least partially be fabricated from a substantially athermal material and/or being geometrically designed to cancel thermal expansions effects.

The shown examples need not to be considered exclusive as the present invention can also be applied to other types and geometrical designs of machines, which are not shown explicitly herein.

Figure 2A:
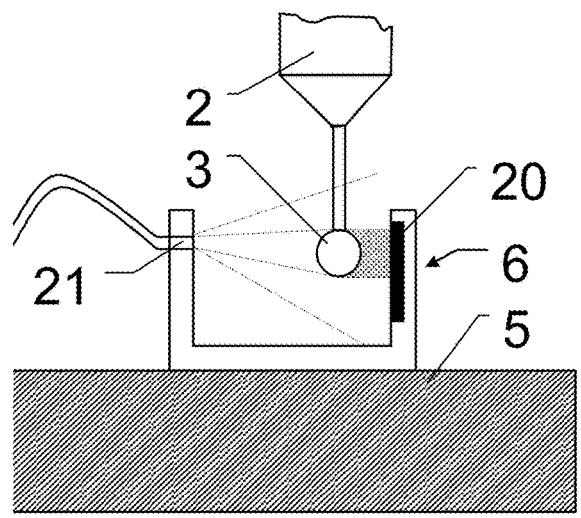
FIG. 2a shows an example of a first embodiment of a geometry monitoring system according to the invention.

FIG. 2a illustrates an example of a calibration monitoring unit 6 according to the invention, where an artifact 3 at the second machine portion 3 is precisely sensed and measured in at least two dimensions, preferably in at least three dimensions. The artifact 3 can be any artifact 3 with certain dimensions allowing compact design, preferably spheres with diameters smaller than 30 mm, which is applied at the second machine portion 2 specifically for the purpose of the present invention, but can e.g. also be a tactile probing artifact 3, which are generally used for such purposes, of a measurement stylus at a probe head 2 as second machine portion 2.

In this example, the sensing is done by establishing a shadow image of the artifact 3 onto a photosensitive sensor 20. Obviously, shadowing implies that the artifact 3 is not—or at least not completely—transparent for the wavelength of light which is evaluated. The artifact 3 can e.g. be a measurement probe tip, like a tactile sphere at the stylus tip, which is moved in-between a light source 21 and the photosensitive sensor 20, resulting in a shadowing of a portion of the sensitive area on the photosensor 20. The photosensor 20 can e.g. be embodied as a CCD or CMOS camera chip, or can also be embodied as any other arrangement of one or more photosensors 20, in particular photodiodes, being configured to derive a positional information of a light pattern applied to it, like one or more CCD-, CMOS-, or Photodiode-lines or Photodiode-arrays, a Quadrature-Photodiode, a dual triangular shaped bi-cell-photodiode, etc. Also, a one or two dimensional PSD which is based on the lateral photoelectric effect, can be an embodiment of the photosensitive sensor 20. Alternatively, also one or more fieldless CMOS or partial CMOS can be used as photosensitive sensor 20 according to the invention. Also, a spreading of more than one CMOS can be used. Also rolling shutter approaches or other specific readouts can be implemented as known in the art.

By evaluating the photosensitive sensor 20, the calibration monitoring unit 6 optically senses the artifact 3 precisely in its location and derives dimensional location information in at least two, preferably more degrees of freedom in a single time acquisition—which means in short measurement time. For example, a center of the artifact 3, like a tactile ball at a measurement stylus can be derived from the photosensitive sensor 20 data. Such can be done in short time, preferably in a single measurement shot of short duration, e.g. in the order of the exposure time of the photosensitive sensor 20 under the illumination conditions provided by the light source. Nevertheless, also an evaluation based on multiple of such exposures can be used according to the invention, e.g. to improve accuracy or for the specific embodiments discussed below—while still resulting in short sensing times. For example sensing times of a calibration monitoring unit 6 according to the invention can be in the order of seconds or preferably below.

In general, an approaching of the location of the calibration-monitoring-unit 6 within the working volume of the machine, by the artifact will take more time than the optical surveying, in particular when the moved artifact should be allowed to settle to a steady state at the calibration-monitoring-unit 6 for the sensing. But in a specific embodiment according to the invention, there can also be an evaluation of dynamics of machines movements. Those can e.g. be derived from such a settling motion of the artifact 3, when it is moved into a sensing range of the calibration monitoring unit 6, or by a defined stimulation of the drive unit 13 while inside of the sensing range. To derive dynamic properties, like inertia, damping, backlash, rigidity, resonances, frequency responses etc. of the geometry and/or mechanics of the machine, a (e.g. equitemporal) fast sequence of location information sensings derived by the calibration monitoring unit 6, can be evaluated over time and/or with respect to (in particular temporal) corresponding coordinate information values from the encoders of the machine 1. Such can be considered to be an additional aspect of the present invention or even a dedicated invention.

In FIG. 2a, a special configuration is provided at the base 5 of the machine 1 to place the artifact 3—which can e.g. be the same artifact as also used for tactile object measurements in a CMM—in about the middle between a camera 20 and an illumination 21, which is in this example provided by an optical fiber. Such an optical fiber can bring the advantage of avoiding that the actual light source—as a potential source of undesired heat—is located directly at the calibration-monitoring-unit 6—compared to another embodiment of the invention, where the light source 21 is directly at the calibration monitoring unit. In the latter case, heat can e.g. be reduced by decreasing the ON-time of the light source 21 or by pulsing it, preferably synchronized with the photosensitive sensor 20 and/or only during the sort time the sensing takes place. Via a shadow imaging, an optical sensing or measuring of a location information of the artifact 3 can be derived, e.g. in form of a geometrical estimate of a location of a center of the shadow of the artifact on the photosensitive sensor 20 in at least two dimensions, and thereby also with respect to the calibration-monitoring-unit 6 and with respect to the base 5.

Another example which relates to a CMM as machine 1 is to generate a so called "map" of the CMM, which comprises calibration data to improve the measurement accuracy of the CMM. The maps actual implementation can be highly vendor-specific, but in general it maps the coordinate information from the positional encoders 12 at the machine axes 10 to corrected for individual machine characteristics, inaccuracy, deviations, etc. Such is known to be done in burdensome commissioning or calibration process, which requires external equipment, references, laser interferometers, etc. According to the invention, such a map can be generated and/or updated in its parameter values. In particular the present invention enables to update the map-parameters more often and/or at a regular basis, even while the machine is in use. Besides such a map there can also be other models of the machine, e.g. physical models, finite-elements-models, black-box models, loop-up tables, parameterized conversion formulas, statistical models, neural network models, which can according to the deviations in geometric machine properties be established, parameterized and/or updated.

In addition to the location information sensing, the compensation parameter can also be deduced based on additional inputs, like temperature sensors at one or more locations on the machines structure, or other sensors for environmental or machine-operating factors.

The present invention can also be established by providing more than one calibration monitoring units 6 and/or more than one artifacts 3 at a machine 1. Therein the first and/or second machine portions 2,5 at which the calibration monitoring units 6 and/or artifacts 3 are provided can vary. For example when a machine 1 comprises more than one movable axis, there can be a calibration monitoring unit 6 for each of the axis or another clever arrangement of multiple calibration monitoring units 6 at multiple locations on the machine 1, which arrangement is configured for this machine-setup to determine derivations of the geometric properties of the machine 1 in multiple degrees of freedom, in particular to specifically derive relevant deviations for this specific machine 1.

To derive the deviation in geometric properties of the machine which are monitored, the sensed multi-dimensional location information of the artifact is brought into relation to former sensings of this location information and/or with the positional information from the encoders of the one or more machines movement axes. By latter, e.g. the artifacts coordinate position information derived by the encoders can be compared to the artifacts location information derived by the calibration monitoring unit, and based on differences, a geometric deviation of some portion of the machine 1 can be deduced. For example, an initial reference can be stored and then subsequent deviations can be compared thereto. According to the invention, a history of sensings and/or deviations can be stored and compared to, and this history can also be taken into account in the deriving of compensation parameters for the encoders coordinate information. The deviations according to the invention can in many embodiments be considered to only relate to relative differences of the deviations and/or sensings and not necessarily on absolute values. In particular the progression of the location information or the deviation can be evaluated, and a calibration of the machines absolute accuracy can be established by other means.

According to the invention, the optical sensing can not only be used to derive a location information of the artifact 3 in two lateral directions in the plane of the optical sensor 20. Optionally, also the location information of the artifact 3 in the line of direction in-between the light source 21 and the sensor 20 can be derived, as with the shown substantially point-light-source, the shadow changes in size when the artifact 3 moves in this direction in the figure. Thereby, the setup of FIG. 2a can also sense location information of the artifact 3 in at least three dimensions. A similar effect can also be used and applied to other embodiments described herein.

Further, if the shape or outline of the shadow of the artifact 3 is evaluated by the photosensitive sensor 20, additional information can be gained. E.g. a mechanical damage to an artifact such as a measurement stylus of a CMM can be detected or also a contamination of the measurement stylus by adhered dirt can be detected, e.g. compared to a defined known reference shape and/or if the sensed shape of the measurement stylus changes compared to a prior sensing of the same measurement stylus.

The determining of deviations of geometric machine properties according to the invention is done recurrently. This does neither mean that it is done continuously, with an artifact 3 that stays in the calibration monitoring unit 6 for a long time, e.g. in the range of minutes or more or even continuously. The sensing according to the invention is on the other hand also not done only every now and then, e.g. at an interval of months, weeks or days, or only once at commissioning, but more frequently, in particular e.g. at least multiple times a day or more often. In an example the method according to the invention can in particular be carried out multiple times an hour. According to the invention the artifact 3 is moved into the calibration monitoring unit 6 for a short time, in particular for the time which is required for an instance of the sensing, and it then moves out of the calibration monitoring unit 6. For example the machine 1 interrupts its workflow, moves the artifact 3 to the calibration monitoring unit 6 for the short time required by the actual sensing and then moves the artifact out again to resume its workflow.

In another embodiment according to the invention, the setup can also be reversed, for example the artifact 3 can be located at the first machine portion 5 and the calibration monitoring unit can be located at the second machine portion 2. Besides a fixed arrangement, e.g. in an embodiment where the second machine portion is configured to comprise an exchangeable tool, the calibration monitoring unit can therein also be exchangeable—in a specific embodiment e.g. battery powered and/or quipped with a wireless communication interface for controlling the sensing in order to avoid the otherwise required wired link. On or more artifacts 3 can then be fixed to the first machine portion.

Figure 2B:
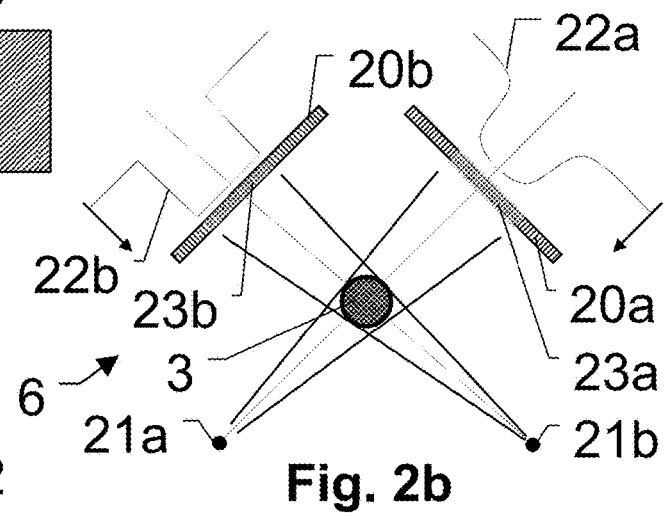
FIG. 2b shows an example of a second embodiment of a geometry monitoring system according to the invention.

FIG. 2b illustrates another example of a calibration monitoring unit 6 according to the invention. In this embodiment, two light sources 21a and 21b are used and also two corresponding optical sensors 20a and 20b are used by the calibration monitoring unit 6 to sense the artifact 3. Accordingly, there are two shadows 23a and 23b, resulting in the shown intensity profiles 22a and 22b, wherein 22b illustrates one variant and 22a another alternative—which will be discussed below. In general, only one of those options would be preferred to be implemented in a single calibration monitoring unit 6. In this embodiment a preferred, substantially 90° arrangement of the two sensings is shown, but also other angular arrangements can be used. By this setup, a location information of the artifact 3 can be sensed in at least two dimensions, according to a determining of a center point of the artifact 3 as it is indicated by the broken lines crossing at the center of the artifact 3. Those broken lines are therein established in-between the light source 21a/21b and a center of an intensity profile 22a/22b at the optical sensing unit 20a/20b. The here shown different intensity profiles with soft edges 22a or hard edges 22b are examples relating to the different embodiments of FIG. 3a to FIG. 3e, in practical setups of multiple sensing, preferably only on of those options will be implemented. In an embodiment of an analysis of the sensing by a determination of a center of gravity of the intensity profile, the evaluation can be designed to be rather invariant of edge-sharpness, but other evaluations according to the invention might rely on sharp edge-profiles such as 22b, in particular if a diameter of the intensity profile is evaluated.

If one or more of the optical sensors 20a,20b are configured to sense the intensity profile 22a/22b in more than one dimensions, specifically also in a dimension perpendicular to the paper-plane, the location information can be derived in at least three dimensions, e.g. as discussed with respect to FIG. 2a.

Figure 2C:
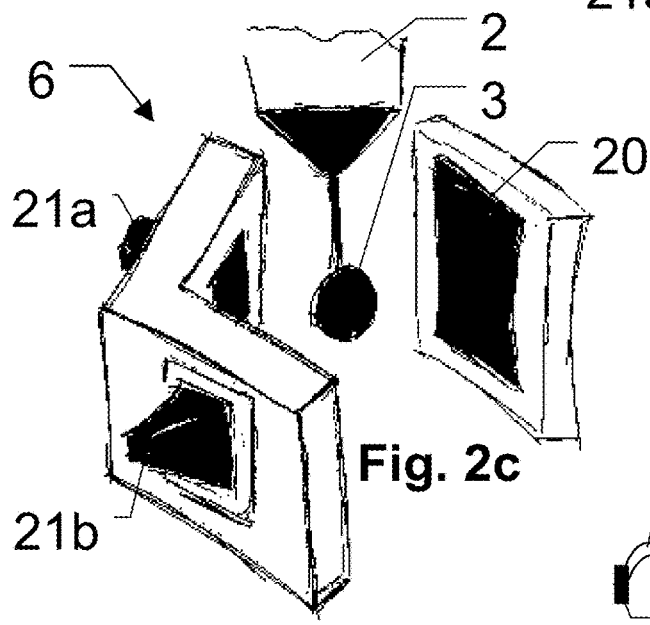
FIG. 2c shows an example of a third embodiment of a geometry monitoring system according to the invention.

In the embodiment of FIG. 2c there are two light sources 21b and 21a, but only one single photosensitive element 20. The underlying principles can be similar to the ones of FIG. 2a or FIG. 2b. In this case the single photosensitive element 20 is tilted relative to the emission directions of the two light sources 21a and 21b. In this embodiment it is also possible to gain additional degrees of freedom and or more accuracy in the sensing of the artifact 3. The light sources 21a,21b can be turned on in different constellations, individually or combined, which results in different shadows on the sensor 22. Also, the light sources 21a,21b can emit one or more different colors e.g. blue (B) and red (R). By using an RGB image sensor as a photosensitive element 22, both, the blue and the red shadow images can be recorded simultaneously. The simultaneously recorded R- and B-images can then be evaluated independently by the signal processing. By such a simultaneous measurement, the accuracy of the measurement can be increased. Evaluating multiple of the therein possible shadow configurations gains additional information about the measurement stylus location, shape and/or geometry. For example, the emitted colors can be switched. Apparently, this embodiment can optionally also be expanded to more than two light sources 21a,21b and/or more than two colors. An arbitrary number of optical sensors 20 and light sources 21 can be used for the monitoring according to the invention. By reduction of the number of the photosensitive elements 20, the costs and evaluation effort can be reduced—but it would also be an alternative option to reduce the number light sources 21 and to increase the number of light sensor 20.

Figure 2D:
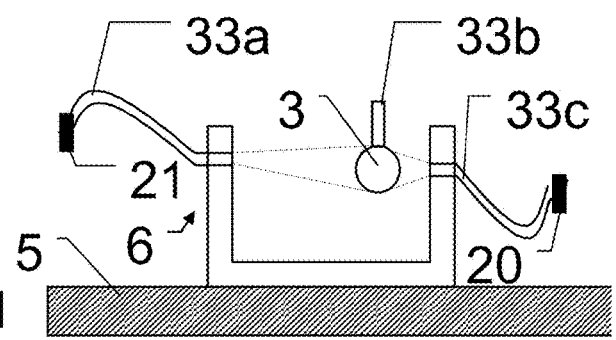
FIG. 2d shows an example of a fourth embodiment of a geometry monitoring system according to the invention.

Instead of using cameras as photosensitive elements 20, in other embodiments, e.g. as illustrated in FIG. 2d or in other embodiments similar to the ones shown before, optical fiber couplings can be used as an indicator of positional/orientation of the transparent artifact 3 with a refractive effect like a lens, e.g. due to drifts of the measurement stylus by long term effects. A static optical fiber-end 33a placed at the base 5 and an optical fiber-end 33b placed at the artifact 3 can be used to detect deviation in the location, as the efficiency of a coupling in-between those optical fibers 33 is strongly positional dependent. Depending on the design, sub-micrometer positioning accuracy can be required to get a maximum signal through a free-beam fiber coupling with a refractive artifact 3 in-between. The location of the maximal coupling efficiency can be determined, whereby a highly accurate location reference of the artifact 3 and therefore of the second machine portion 2 with respect to the first machine portion 5 is established. For example, the artifact can be moved through the calibration monitoring and the coordinate information from the encoders 12 is recorded together with the coupling efficiency and/or the coordinate information from the encoders 12 at which a maximum and/or minimum coupling occurs is captured.

In another variant of such a fiber coupling embodiment according to the invention, the artifact 3 can be moved in-between a transmitting optical fiber 33a and receiving optical fiber end 33c which are both located at opposite sides of the calibration monitoring unit 6. The resulting coupling factor along the movement path can be evaluated, e.g. locations of minima/maxima can be derived and/or a center location of the artifact can be derived thereof, e.g. according to a center of gravity of the coupling factor curve along the artifacts movement position when passing through the light beam.

In another embodiment of the invention, also another effect than sensing the artifact 3 according to shadowing can be used to determine deviations in geometric properties of the machine 1. For example, if the artifact 3 comprises a ruby-ball or another reasonably optically transparent touch probe tip. According to the invention, the so-called ball-lens-effect of such artifact, which forms a kind of optical element, can be utilized. By an according setup of one or more light emitters 21 and one or more photosensitive elements 20, which are configured to sense and evaluate a location and/or a shape of the emitted light which is refracted by this artifact, a location information of the artifact can be sensed. For example, a projection of the emitted light by the ball lens can be sensed on the photosensitive sensor 20. In this fashion, the refractive properties of the artifact can be exploited to derive a precise location information of the artifact itself, as the refractive effect, in particular a certain specific refractive effect like a deflection, a focusing, etc. which is achieved, is dependent on the location of the artifact with respect to the calibration monitoring unit and its optical elements arrangement. For example, in a CMM, the refractive characteristic of each of the therein used measurement stylus artifacts 3 can be calibrated once for its specific refractive characteristic and in a further of the recurring determinations the characteristics can be compared to this reference, or the artifact can be moved until the same reference is re-established.

The monitoring according to the invention can preferably be executed recurrently, which means from time to time, periodically according to a schedule or at certain instances such as loading the machine with a new measurement object 4, switching on the machine, measured environmental changes like temperature, etc. In addition, it can be advantageous to gather temperature information at certain locations along the kinematical-chain of the machine and upon detection of a temperature change, the method according to the invention can be triggered.

As long as the artifact 3 is moved within a sensing range of the calibration monitoring system 6 according to the invention, also dynamic effects can be derived, in particular when an accordingly high sensing rate provided. In another embodiment, where reproducible and preferably harmonic movements are applied, the sensing rate could also be low, e.g. even lower than the period of the harmonic movement, as by acquiring a phase shifted sensing with respect to drive unit movement, an undersampling over an accordingly longer sensing duration can be established to derive results similar to those of a higher sampling rate. Especially in view of single shot measuring of a location information of the artifact in more than two dimensions, which results in short sensing times as already discussed, such is in general feasible according to the invention. Thereby, e.g. also dynamic deflections during a movement of the second machine portion 2 by the drive unit can determined and compensated for in a dynamic-deviation sensing embodiment or variant of the invention.

In a specific embodiment, the invention can therefore relate to a machine state monitoring system for recurrently determining a change in properties of a geometry of a measurement machine and/or machine tool, in particular of a CMM, CNC-machine and/or robotic arm, which machine is configured with positional encoders to derive a coordinate information of at least a first machine portion with respect to a second machine portion, and which machine portions are movable with respect to one another by a motorized drive unit along a defined trajectory. Therein, the monitoring system comprises at least one calibration-monitoring-unit with a two dimensional optical measuring location sensing unit, which is fixed to the first machine portion and configured with at least one light source and at least one two dimensional optical sensor to derive an at least two dimensional location information of a shadow of at least one artifact provided at the second machine portion, which artifact is preferably substantially ball-shaped and, which artifact is temporarily moved in-between the light source and the two dimensional optical sensor of the calibration-monitoring-unit,
in particular wherein the calibration-monitoring-unit is configured for determining a change in the properties of the geometry of the machine—in particular static and/or dynamic properties like a compliance property, a thermal expansion property, a stress property and/or strain property due to dynamic or static forces or dynamic movements of the artifact—by a comparison of multiple of such at least two dimensional location information.

The change of the properties of the geometry of the machine can in particular be recurrently established with an intermittence or interrupt of a course of a regular operation of the machine, moving to the artifact to the calibration-monitoring-unit, derive the at least two dimensional location information, and resuming the course of a regular operation of the machine. In particular this can be done recurrently at multiple single time instances and/or during multiple time sequences in which sequences multiple location information are sensed.

Based on the change in the static and/or dynamic properties of the geometry of the machine, compensation parameters of a model or map of the geometry of the machine that is used to derive the coordinate information from the encoders can be updated. By corrected coordinate information derived according to the model or map of the geometry of the machine, the moving of the machine can be controlled, in particular to follow a desired trajectory more accurately than without.

Figure 3A:
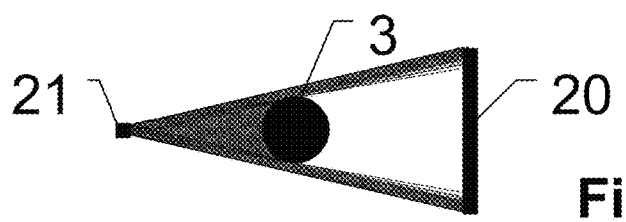
FIG. 3a, FIG. 3b, FIG. 3c, FIG. 3d, FIG. 3e are showing examples of a geometry monitoring system according to the invention in two side arrangement.
Figure 3A:
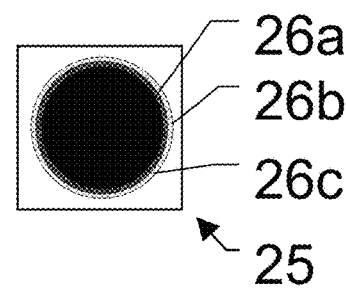

In FIG. 3a another illustration of an embodiment of the optical sensing according to the invention is shown.

The light source 21 can therein be specifically embodied to substantially form a point light source. A laser diode, an LED or an outlet of an optical fiber can in general be configured to reasonably fulfill the properties of a point light source. The artifact 3, e.g. embodied substantially spherical, results in a shadow. Of this shadow, a location relative to the optical sensor 20—in particular a location of the shadow center, and/or a radial dimension of the shadow can be sensed.

For example, an optical quadrature sensor can sense a center of gravity location of the shadow. The radius of the shadow influences the overall intensity received by all of the sensors of the quadrature sensor. Besides such a quadrature-arrangement, also other geometric arrangements and/or shapes of singular photo-sensors can be used as photosensitive sensor 20 according to the invention. Similar center of gravity evaluation of a shadow or focus point can also be achieved by a multi-pixel camera-chip, by a PSD as photosensitive sensor 20 according to the invention.

According to the lateral location of the center of gravity and the radius of such a shadow (or of a focusing point), it is in principle feasible to derive all three lateral degrees of freedom of the location of the artifact 3 at the second machine portion 2 with respect to the calibration monitoring unit 6, which is fixed to the first machine portion 5. Yet accuracy can e.g. be improved by a configuration of multiple light sources 21 and/or photosensitive elements 20, e.g. as exemplary indicated by the arrangement as shown in the embodiments of FIG. 2b or FIG. 2c.

The calibration monitoring unit 6 setup can therein be adjusted or calibrated at least once in an initial setup, e.g. regarding the light source 21 to optical sensor 20 distance and/or geometry with and/or without an artifact 3 in place. Optionally, also a model of the calibration monitoring unit 6 can established and used for compensation of environmental effects, e.g. for its dependence on temperature, etc.

When the light source 21 is not an ideal point source, as in the shown example, the shadow-image 25 as received by the optical sensor 20 shows a core shadow 26a, surrounded by a non sharp decay indicated by 26b and 26c. Yet, regarding the location of the center of gravity the decay does not result in errors, wherefore a calculation of a center of gravity is a preferred embodiment for sensing the dimensional location information of the artifact 3.

Figure 3B:
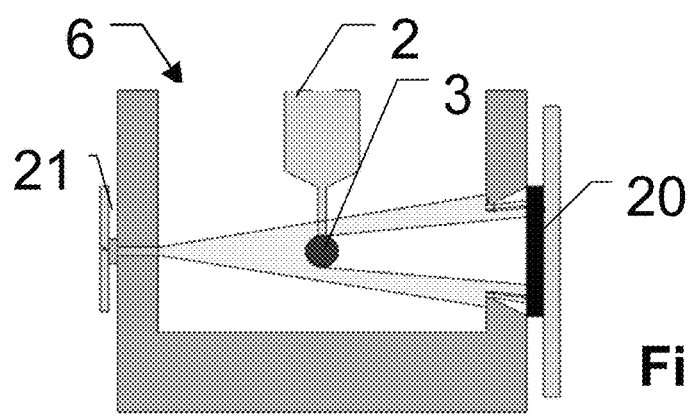
Figure 3B:
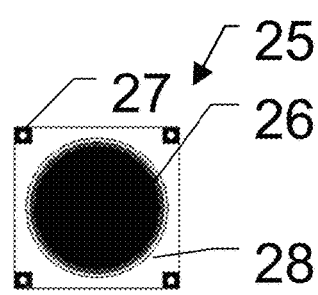

FIG. 3b shows another embodiment according to the invention, which further improves the sensing, improves the stability of the setup and/or improves the immunity against geometric deviations of the calibration monitoring unit setup against temperature effects or the like. In this embodiment such may be achieved by reference light markers 27 implemented on a frame, which can be sensed by the optical sensor 20. Exemplary embodied, there are four defined light patterns 27 projected in each of the corners of the image 25. In this way, e.g. a relative movement between the frame and the optical sensor 20 becomes observable.

Also shown is the option of providing the light source 21 by means of an optical fiber or waveguide. Even a short length of such an optical component can improve the positional accuracy and stability of the location of the light source. Further, its emission characteristic can be improved and heat produces by the lights source can be radiated away from the calibration monitoring unit 6.

Figure 3C:
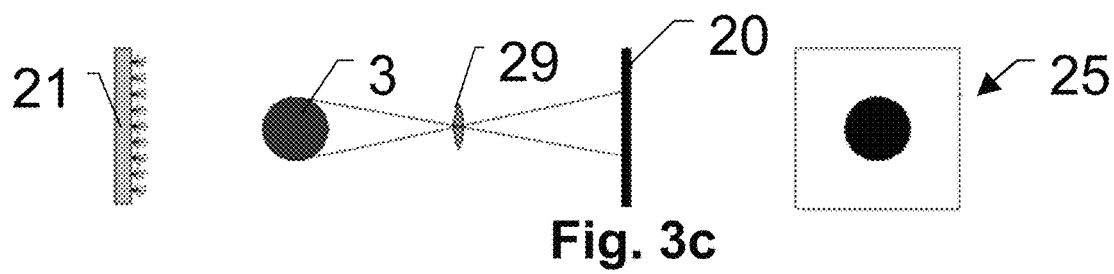

In the embodiment of FIG. 3c, the light source is embodied as a diffuse light emission area. The optical sensor 20 is provided with fixed optics (e.g. a single lens or a lens-system) to image the artifacts 3 shadow onto the sensor 20, preferably in a sharp image which has sharp contours. Such a setup can provide an advantage as it tends to be rather invariant with respect to the position of the light source. The sharp imaging can also gain accuracy improvements, in particular in view of determining the diameter of the shadow which can be done more accurately due to the sharper edges. The optics is preferably embodied as a telecentric objective lens, providing a constant distance independent image scaling to the sensor to accurately determine the lateral location of the shadow. If using endocentric optics, also the distance location of the artifact 3 should be measured, wherefore such an embodiment is increasing the measurement complexity.

Another variant of the invention comprises a use of fluorescent material, e.g. incorporated into the artifact 3, coated onto it or otherwise attached to it. Such can be done either in a homogeneous or in a structured manner. Illuminated by an exiting light source (e.g. in the blue or ultraviolet wavelength range), the fluorescent material absorbs the excitation light and re-emits light at a typically different wavelength. Thereby, the fluorescent material at the artifact may act itself as an active light source, which can be imaged onto the photosensitive element 20. The shape of the fluorescent material as light source is therein preferably implemented planar or specifically structured in such a way, to provide characteristic light emission features, which features support for a precise location of the artifact 3 by the photosensitive element 20.

A benefit of using such a fluorescent secondary source of measurement light at the probe can be that a reduced (or even eliminated) sensitivity to positional drifts of the excitation light source for sensing of the artifacts 3 location information is established.

The possibility to use an excitation wavelength, for which the photosensitive element 20 is insensitive or which wavelength is filtered out in front of the photosensitive element 20, can bring the additional advantage that only the secondary light incites the photosensitive element 20 and the excitation wavelength or flares thereof cannot disturb the sensing. For example, such can be used in an embodiment, in which fluorescent secondary sources are arranged virtually along the substantially entire perimeter of the artifact 3, whereby an increase of accuracy and/or increased degrees of freedom of the sensing can be achieved by using only a single primary light source.

Figure 3D:
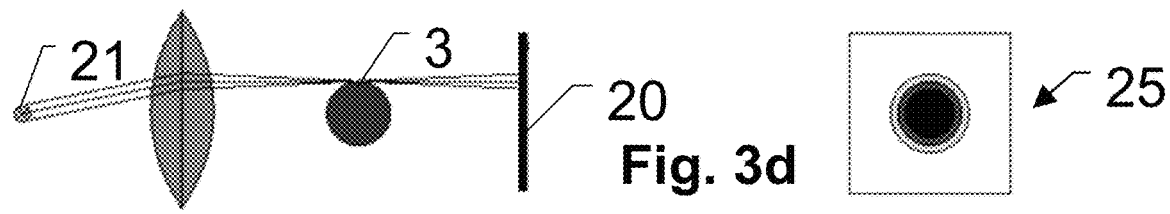

FIG. 3d shows an embodiment of the invention in which a collimating optic 30 is fixed at the light source 21. Thereby the positional accuracy of the light source 21 only needs to be stable in two rotational axes, but translational movements are negligible. This setup is also insensitive with respect to the artifacts 3 location in a direction in-between of the photosensitive element 20 and the light source 21—which can e.g. be compensated by a 90° arrangement as discussed before in FIG. 2b. The photosensitive element 20 can therein be kept simple as no imaging lens needs to be provided.

Figure 3E:
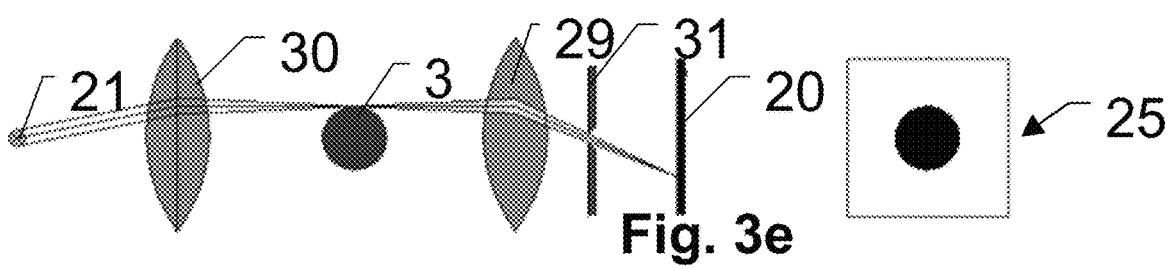

FIG. 3e shows an embodiment of the invention in which a collimating optics 30 is attached to the light source 21 and also with an optics 29 at the photosensitive element 20. The figure also shows an optional aperture 31. The resulting shadowing from the artifact 3 is always sharply imaged and all of the emitted light is used efficiently. Using this embodiment over longer ranges is also possible, but might cause lower measurement accuracy due to diffraction effects occurring at the edges of the artifact 3 and a requirement of a smaller numerical aperture for the observation on the photosensitive element 20, causing a less sharp image. For example, by placing the light source 21 and the optical sensor 20 at different ends of the machine, the location of the artifact can be evaluated along the whole line which is interconnecting those two parts of the calibration monitoring unit 6. Along this whole line, the whole working volume of the machine 1 can be monitored either statically at different points along the line, or dynamically during a movement of the artifact 3 along this line. The lines can e.g. run along one or more axis of movement of the machine, but also in other directions, like diagonally through the whole working volume. Thereby the mapping of the machine can be improved. If arranged and configured properly, in particular multiple times, also influences of a deformation of the base 5 can be sensed and compensated for.

Besides having a light source 21 on one side of the artifact 3 and an photosensitive element 20 at substantially the opposite side, the present invention can also be embodied by having both of those elements 20 and 21 substantially on the same side. The artifact 3 is therein substantially diffusive reflective or mirror reflective (at least for the wavelength of light used for the sensing), whereby intensity measurements and/or distance measurement by light reflected from the artifact 3 can be established.

Figure 4:
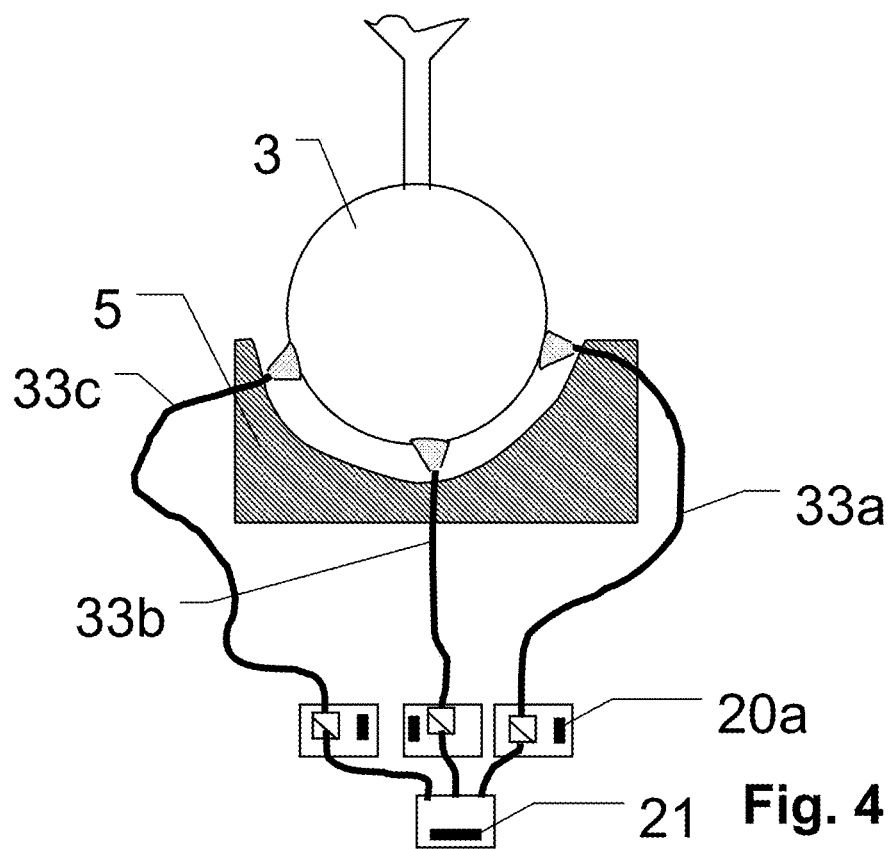
FIG. 4 shows an example illustrating a first embodiment of a geometry monitoring system according to the invention in single side arrangement.

Another example on how the invention can be embodied is illustrated in FIG. 4, showing three or more optical fibers 33a,33b,33c pointing on an artifact 3, such as a sphere of the measurement stylus of a CMM. If the artifacts geometry is known, in particular if it is a sphere or ball, then multiple radial distance measurements can be established. In the shown example, there are three optical fibers 33a,33b,33c used, each for measuring a distance and/or an intensity of reflection. Thereby, the location of the artifact 3 with respect to the base 5 can be determined precisely. Based thereon, a deviation of the geometry of the machine 1 can be detected and compensated for.

Such a system can use a single fiber by coupling the reflected light back into the same fiber which transmits the light from the light source 21 to the artifact 3 and use a splitting element (like an optical circulator, etc.) to divert the received light to the sensor 20a. Alternatively, separate transmitting and receiving fibers can be used. The overall location information sensing accuracy can be improved by sensing more than the minimum number of required distances and/or intensities towards the artifact 3. Instead of using a single light source 21, also multiple independent light sources 21, in particular which are emitting different wavelengths, can be used. In this way a signal separation can be done chromatically, e.g. by using dense wavelength division multiplexing (DWDM) fiber components, or other chromatic elements.

The embodiment of the invention shown in FIG. 4 can be used for multiple distance measurements. The distance can be measured by an optical interferometer, based on a time of flight and/or based on a phase measurement principle.

Figure 5A:
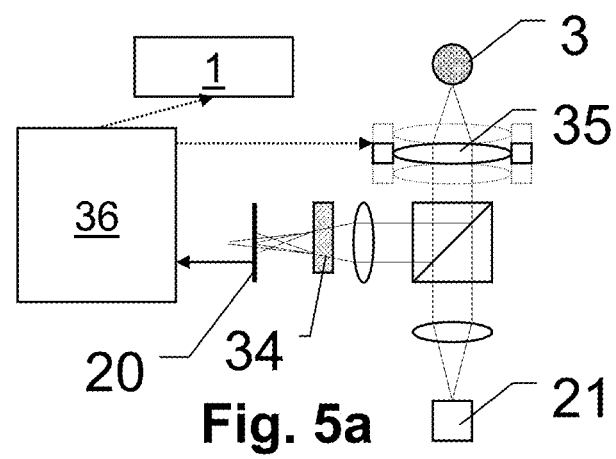
FIGS. 5a, 5b, 5c and 5d are showing an example illustrating a second embodiment of a geometry monitoring system according to the invention in single side arrangement.

Another approach of an artifact 3 distance measurement, e.g. as shown in FIG. 5a, can be based on an astigmatic effect on focusing, similar to the setup used in optical disk players, like CD or DVD players, e.g. as describe in detail in U.S. Pat. No. 5,850,081, which is herewith incorporated by reference with respect to details on this technology. For example, a cylindrical lens 34 in the backscattered beam from the artifact 3 results in an astigmatism. The shape of the reflected or backscattered beam depends on the focal position of the optics 35 and the artifact 3. This backscattered beam is then evaluated for astigmatism by the optical sensor 20, e.g. embodied as a 4-quadrant diode 20. Based on simple sum and difference signals of the four intensity signals from the 4-quadrant diode 20, a focal dependent signal can be derived. In this embodiment, this signal directly indicates a distance to the artifact 3 as sensed location information. In another variant indicated by the broken lines, the focus can be mechanically adjusted to zero the astigmatism, wherein the level of adjustment reflects the distance towards the artifact 3 as sensed location information. By using multiple of such distance measurements, a location information of the artifact 3 can be sensed in multiple dimensions.

Figure 5B:
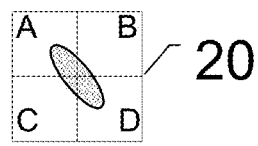
Figure 5C:
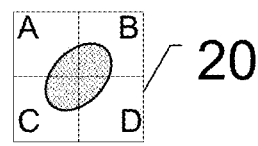
Figure 5D:
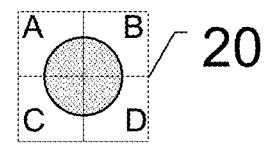

FIG. 5b and FIG. 5c are showing examples, of a resulting light spot on the photosensitive element 20 in FIG. 5a, when the artifact 3 is not in focus. The resulting signals from the different photo-sensors A-B-C-D can evaluated directly, preferably relative to each other to be immune to DC-bias and noise, as a measurement value for the artifacts location information.

Alternatively the focus can be adjusted to its optimum, e.g. by moving the artifact 3 or the focal lens 35 to derive a signal at the photo detector 20 as shown in FIG. 5c. Such can e.g. be achieved by a control-loop 36 which is driving the lens 35 and/or the drive units 13 of the machine 1 in such a way that the artifact 3 is in focus. In the shown example, such is the case when there is an equilibrium of the signal from the four fields A-B-C-D. The signal for driving the lens 35 and/or the machine 1 is therein reflecting location information of the artifact 3.

Other optical sensing principles for deriving a location information of the artifact 3, which can be used according to the invention are for example also confocal measurement principles like e.g. white-light interferometry, chromatic white-light sensing, etc.

Figure 6A:
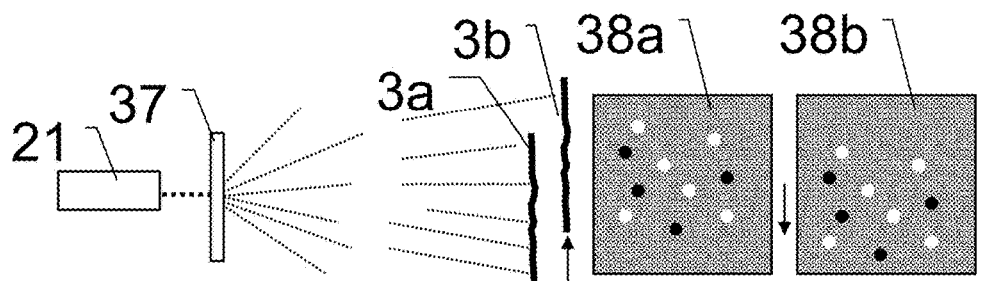
FIG. 6a and FIG. 6b are showing examples illustrating a third embodiment of a geometry monitoring system according to the invention in single side arrangement.
Figure 6B:
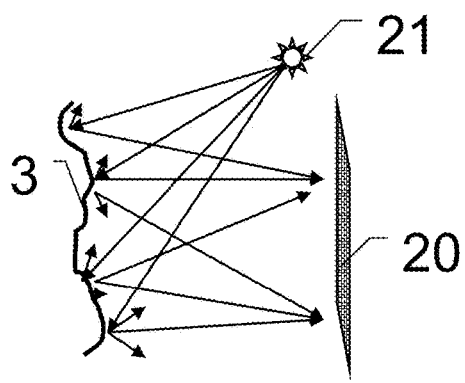

Another embodiment according to the invention is illustrated in the example of FIG. 6a and FIG. 6b. It bases on a measurement based on speckles, which are effected at a surface of the artifact 3 by the light source 21 being coherent. Optionally, also a diffuser 37 can be used for the emitted light. The backscattered light results in an interference speckle pattern which can be captured by an optical image sensor 20. The principle of constructive and destructive interference which result in the speckle-pattern is illustrated in FIG. 6b, wherein the upper rays on the photosensitive camera 20 are constructively interfering, while the lower rays are at least partially canceling out due to their phase alignments. Movements of the artifact 3, as indicated by the two artifact positions 3a and 3b, results in movements of the speckle pattern 38a and 38b, which movement can be sensed and the location information of the artifact can be derived with a two dimensional optical image sensor 20 in at least two dimensions. By using more than one of such speckle sensor arrangements, additional dimensions can be sensed, including also rotation of the artifact 3, by which the speckle pattern is turned. For example by using two of such speckle sensors for the location information of the artifact 3 according to the invention, the artifact can be evaluated in at least 2.5D.

Figure 7:
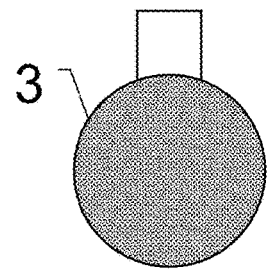
FIG. 7 shows an example illustrating another embodiment of a geometry monitoring system according to the invention.

FIG. 7 shows an embodiment using a special artifact 3, comprising a defined pattern or a hologram. The pattern can be embodied by a reflective and/or transmittiv pattern or hologram, which is accordingly illuminated from the same side and/or from an opposed side of an optical sensor 20. The optical sensor 20 is imaging the resulting pattern by evaluating the resulting optical intensity profile at the optical sensor 20. The setup of the components of the calibration monitoring unit 6 can therein e.g. be as discussed elsewhere in this document. Based in this intensity profile, in particular based on changes within this profile compared to a previously captured reference profile, a location information of the artifact, and based thereon geometric machine deviations can be determined, which can then be compensated for, either numerically or mechanically. Dependent on the pattern or hologram design at the artifact 3, up to 6 degrees of freedom can be evaluated, also including rotations.

FIG. 8a to FIG. 8d are showing embodiments using special artifacts 3 which are configured to provide at least partiality a retro-reflective behavior.

Figure 8A:
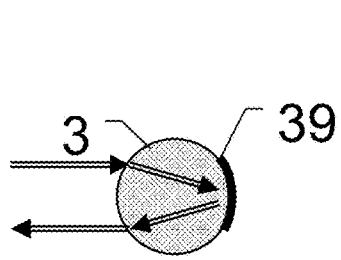
FIGS. 8a, 8b, 8c and 8d are showing an example illustrating a fourth embodiment of a geometry monitoring system according to the invention in single side arrangement.

FIG. 8a shows a artifact 3 in form of a Luneburg lens, which is retro-reflecting an incidence of light back into the same direction. In the shown example, such is achieved by special coating 39, but it could also be established by special material configurations inside of the artifact. For example, an artifact 3 embodied as a touch probe ball made out of sapphire or of another at least partially optically transparent material or of multiple materials, which are configured to result in having a refractive index of about~2 can be used. Also, a ball shaped achromate or a Luneburg lens can be used as artifact 3 according to this embodiment of the invention. For the present invention, it is in general not required to be 100% retro-reflective, as only a relatively small portion of retro-reflected light can be sufficient, e.g. in view of the short distances to the artifact 3 in the calibration monitoring unit 6. For example, uncoated spheres tend to have a backwards reflectivity of about 5-10%, divergent from the front surface and collimated from the back surface, which can be used according to the invention to sense the location information of the sphere. This reflectivity factor can be improved by special inner and/or outer coatings of the sphere. For example, to avoid the reflections from the front surface, the sphere can be coated antireflective at the front surface and/or reflectively at the back side.

Figure 8B:
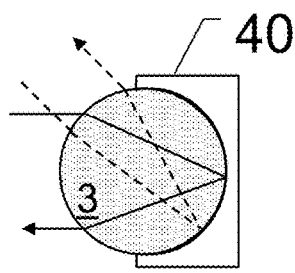

In the embodiment of an artifact 3 according to the invention shown in FIG. 8b, an interface boundary of the artifact is configured to achieve retro-reflectivity. The interface boundary can e.g. be configured to achieve a total reflection for the used wavelength when placed within the environmental medium of the calibration monitoring unit, which can be air but optionally also some other gas or liquid. Another option is to configure a specific interface boundary by touching the artifact 3 to a special material 40.

In another embodiment, also a reflectively coated (e.g. spherical or parabolic) reflector 40 can be provided—either directly at the artifact 3 itself—or at the calibration monitoring unit 6 and then the artifact 3 is moved in front of it and the change of the retro-reflective properties is detected, respectively the retro-reflective property will only be established, when the artifact is at a certain location with respect to the item 40.

Figure 8C:
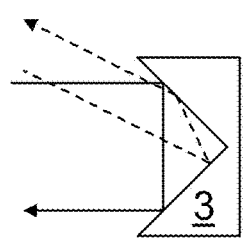

The retro-reflective artifact 3 in FIG. 8c is embodied as a classic prism-retro-reflector, which is to be attached to the second machine portion and to be moved into the sensing range of the calibration monitoring unit 6 to derive and check its location information, e.g. by comparing the location information with the ones of one or more previous sensing.

Figure 8D:
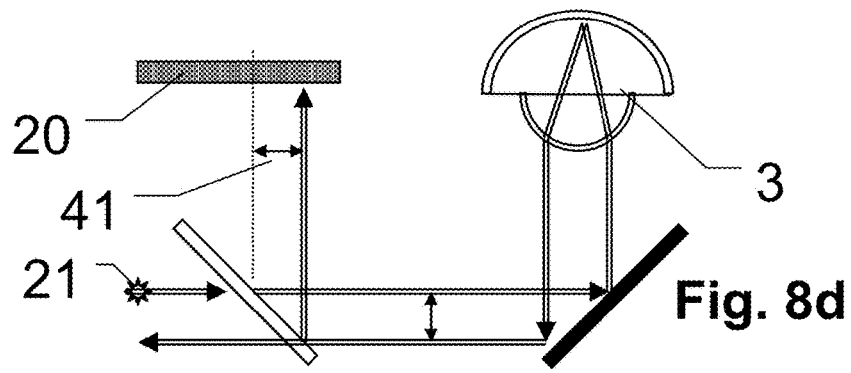

FIG. 8d illustrates one of the possible setups of the calibration monitoring unit 6 according to the invention, when a retro-reflective artifact 3 is used. By applying an offset 41 determination in-between a transmitted light beam from the light source 21 and a received light beam from the retro-reflective artifact 3 by means of the optical sensor 20, a location information of the artifact 3 can be sensed. By using multiple beams, e.g. from different directions, a location information of the center of the retro-reflective artifact 3 can be sensed.

In the special embodiments shown in FIG. 9a to FIG. 9d, there is—in addition to the static determining of the deviations in the geometry and/or position of the artifact 3 with respect to the sensing unit 6 of the machine 1—also a determination of force related property extraction or change monitoring. Such force related properties of a machine 1 can be mainly compliancy for inaccuracies along a kinematical chain of the machine 1.

Figure 9A:
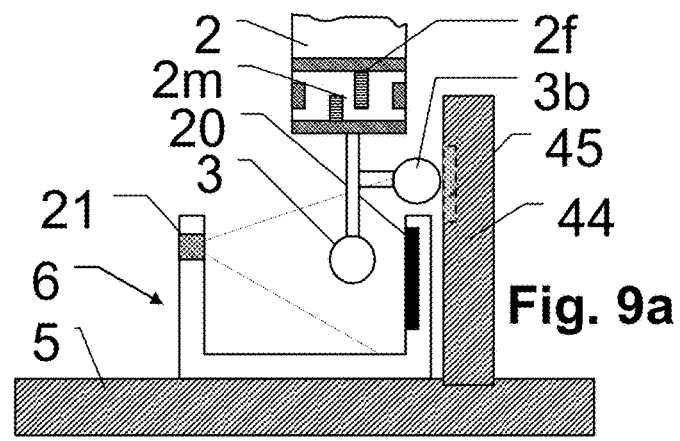
FIGS. 9a, 9b, 9c and 9d are showing examples of embodiment of a geometry monitoring system according to the invention with a rigidity determination.

FIG. 9a shows a first machine portion 5 with an embodiment of the calibration monitoring unit 6. Besides the light source 21 and photosensitive element 20, which can be embodied as described elsewhere in this document, there is also a force sensing unit. In this embodiment the force sensing unit is in particular embodied by a one or more rigid end stops 44. The rigid end stop 44 can therein be fixed to the calibration monitoring unit 6 and/or to the first machine portion 5. For deriving stability and dynamic aspects of the geometric properties of the machine 1, the artifact 3 is not—or not only as both aspects can optional also be sensed in succession—placed freely in the sensing range of the calibration monitoring unit, but is touching the end stop. A force value of this touching is measured. In a first variant, such a force value can be sensed at the artifact side, directly by the artifact or by the second machine portion 2 at which it is applied. For example, in case of a sensing probe of a CCM, such as a scanning probe, there are already sensors for determining such forces and/or geometric deflections caused by those forces. In the shown example there is a force, respectively a force proportional deflection, in-between the probe head portions 2f and 3m measured. The force and or deflection is preferably determined as an analog value, but can is special cases also be a digital one, as e.g. in case of a touch trigger probe. Another option—in particular if the artifact 3 side comprises no such force value sensing means which is providing force related measurements which can be used for this aspect of the invention—is to implement a force sensor 45 at the rigid end stop 44 side. For the sensing of the location information is therein combined with a measuring of the force value. For example, an actual force value at a desired location information can be derived, or an actual location information at a desired force value can be derived. In another option, also a force-over-location curve or a location over-force-curve can be determined by a plurality series of sensings. Based thereupon the geometric properties of the machine 1 can also comprise interacting force or dynamic relevant aspects such as stiffness, rigidity, backlash, play, etc. Those properties can be used to model the machine 1 also in quasi dynamic cases, for example to derive a numerical compensation or machine-map, in particular to correct or calibrate position measurement by the encoders 13 during machine operation.

Figure 9B:
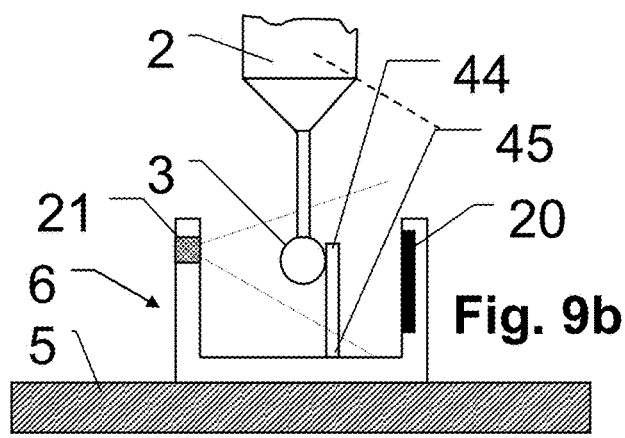

FIG. 9b shows another embodiment. Here the end stop 44 for the artifact is inside the optical sensing unit for the location information. Such can e.g. be achieved by using an optically transparent end stop 44 and/or by impinging the end stop only from a side of the artifact which is not in view for the sensing, like the backside in a shadowing approach. The end stops 44 can also be provided in more than one direction, e.g. in any combination of left, right, front, back, up, down, preferably in those directions in which the calibration monitoring unit 6 can sense a location information.

Figure 9C:
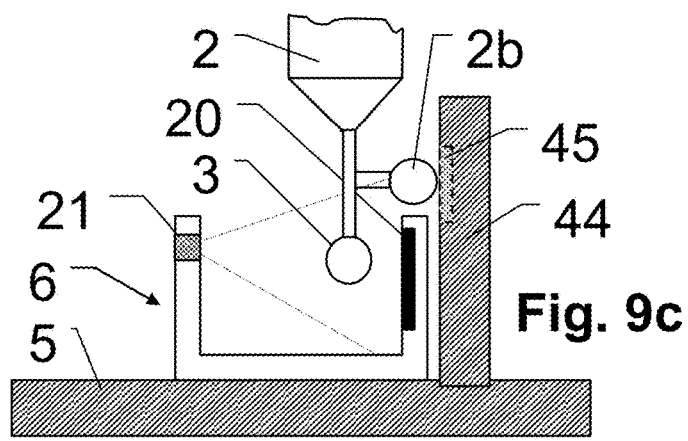

In FIG. 9c the artifact 3 is not sensing the force as in FIG. 1a but the force sensor 45 does sense another portion 2b of the second machine part, by a force sensor 45 at the rigid end stop 44.

Figure 9D:
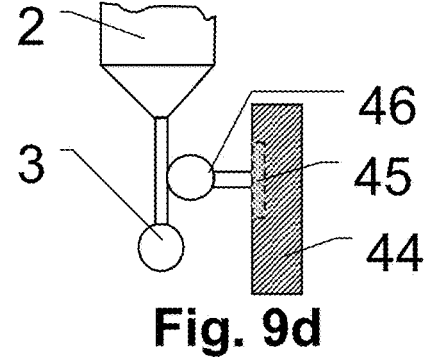

FIG. 9d shows another embodiment, which has an extension 46 of the force sensor 45 at the rigid end stop 44 to touch the second machine portion and/or the artifact 3.

A deviation monitoring system according to the invention can therein be embodied as a method for quickly and often monitoring a machine 1 for deviations or changes of the machine geometry and/or of static machine characteristics and/or of dynamic machine characteristics by a calibration monitoring unit. Such is done with moving an artifact located at a movable portion of a machine to a fixed a calibration monitoring unit at the machine which optically senses the artifact and derives a precise location information of the artifact. This location information, compared to location information of on or more previous sensings and/or with respect to the results of the position encoder values of the machine 1 provides information about an eventually occurred deviation of geometric, static and/or dynamic properties of the machine. Those deviations can be used for correcting the encoder positions of the machine, e.g. directly or by updating parameter of a map or model of the machine. As the optical sensing according to the invention quickly derives location information in two or more degrees of freedom, such a monitoring can be done rather often and recurrently, also throughout a work process of the machine—and not only once at commissioning or in calibration intervals of many hours, days or weeks as it is common for classic machine calibration approaches. Also the calibration monitoring unit according to the invention is fixedly located at the machine, so there is no setup-time needed to establish the monitoring. By a precise monitoring of geometric machine deformations which is done often, e.g. at least twice a day, preferably about every hour or every few minutes, the performance and accuracy of the machine can be increased. Also due to the recurrently monitoring in-between the regular work cycle, mechanical restrictions on the machine rigidity can be relaxed, as deviations are sensed and numerically compensated for.

By the present invention, not only a monitoring of the geometry of the machine, or a monitoring of static or dynamic force-impacts to the machine can be established. In an optional embodiment according to the invention, in addition also further machine health monitoring technologies can be applied as well. For example,
- if the sensed location deviation is greater than a certain acceptable value, or
- if the artifact's representation sensed by the calibration-monitoring-unit 6 has changed more than expected from a desired, initial or former representation, e.g. due to wear, dust, scratches, rupture, etc., or
- if a determined force related reaction or a determined dynamic movement related reaction of the machine 1 has changed more than allowed, specified or expected in comparison to a defined or previous reaction, or
- if another machine property which is sensed by the calibration-monitoring-unit 6 or which is derived from those sensings, deviates from a desired or former state, then a health monitoring device and/or a health monitoring software stored on some storage medium can derive an error message which can be provided to the machine-system and/or user.

Figure 10:
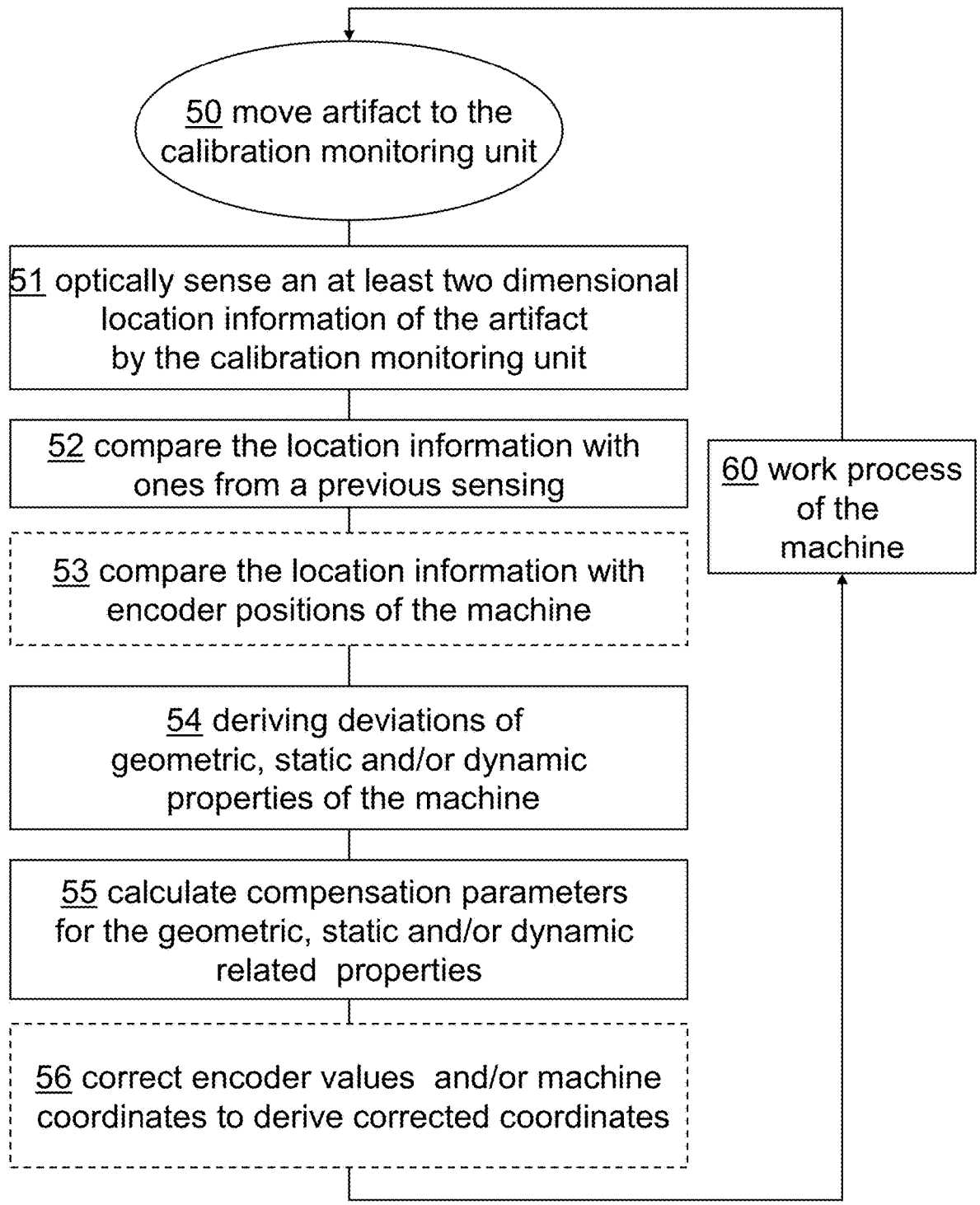
FIG. 10 shows an example of a block diagram illustrating the principle of an embodiment of the method according to the invention.

For a method of monitoring geometric deviations in a machine 1, can comprise steps as shown in the example of a basic block diagram of FIG. 10.

In block 50, an artifact 3 at a second machine portion 2 is moved to a calibration monitoring unit 6 fixed at a first machine portion 5, preferably by a drive unit 13 with positional encoders 12. A position with respect to the first machine portion 5 to which the artifact 3 is moved can therein be derived by the positional encoders 12. The first machine portion 5 can therein comprise one single or more calibration monitoring units 6.

The calibration monitoring unit 6 comprises a position measurement sensor, which is configured for an at least two dimensional optical measuring of an at least two dimensional location information of the artifact 3. Preferably, the at least two or three dimensions are sensed in a single shot measurement, e.g. at the same instance of time.

Such is indicated in block 51, an optically sensing of an at least two dimensional location information of artifact 3 by the compensation motioning unit 6 is done. Preferably the sensing of at least two or more dimensions is done in a single measurement shot, within a short time of a few seconds or preferably below a second, which is preferred as the monitoring can then be done often during the working process of the machine. Optionally the optical sensing can also involve a sensing of a shape of the artifact.

In block 52, the sensed location information is compared with ones from one or more previous sensings, in order to determine deviations which are corresponding to geometric, static and/or dynamic related changes at the machine or other disturbances. In particular, a history of those sensings can be recorded, and also evaluated by statistical methods. Based on the sensed data a map or a model of the machine can be parameterized, respective the parameters can be kept up to date by the recurrently determining according to the invention. In addition, also other environmental influenced like temperature, humidity, load of the machine, weight of an object to be worked with the machine, shock or vibrations, etc. can be recorded together with this history. Based on those additional data, also a predictive model of the machine can be established. Besides a classical physical or mechanical model, such a model can also be established by a machine learning approach, e.g. using a neural network to embody the model.

For improving or calibrating the machine accuracy, the sensings of the location information of the artifact at the calibration monitoring unit can therein in particular be reflected onto the encoder measurements of the machine, which are used for the working process of the machine, whereby an accuracy of those encoder readings can be increased and/or influences of the geometric machine deviations can be compensated for—e.g. as indicated in the optional block 53.

As explained, in block 54, a deriving deviations of geometric, static and/or dynamic properties of the machine is thereby established.

As illustrated by block 55, in a further use of the present invention, a calculating of compensation parameters can be established from the geometric, static and/or dynamic related properties.

And consequently, as optionally indicated in block 56 the machine geometry, static and/or dynamic related deviations can be canceled out or at least reduced numerically, e.g. by taking coordinate measurement values of the machines encoders and correcting them during work process of the machine by applying the compensation parameters, whereby corrected coordinate measurement values are derived, which corrected coordinate measurement values are provides as measurement results and can be used in the machines work process.

In block 60, work process of the machine is done, wherein the monitoring described above is recurrently repeated throughout the work process, e.g. regularly scheduled, at each tool exchange, at each workpiece exchange, at each detected environmental change, etc., preferably in a combination of those.

According to the invention, there can also be more than one calibration monitoring unit 6 in use.

What is claimed is:

1. A machine state monitoring system for recurrently determining a change in static or dynamic properties of a geometry of a machine, which machine is a surface or form scanning machine, measurement machine or machine tool, and comprises:
   positional encoders to derive a coordinate information of at least a first machine portion with respect to a second machine portion, and which machine portions are movable with respect to one another by a motorized drive unit along a desired trajectory,
   at least one calibration-monitoring-unit with a two dimensional optical measuring location sensing unit, which is fixed to the first machine portion and configured to optically sense an at least two dimensional location information of at least one artifact which is provided at the second machine portion, which artifact is temporarily moved into a sensing range of the calibration-monitoring-unit for determining the change in the static or dynamic properties, by a comparison of multiple of such sensings,
   wherein the monitoring system is configured to monitor the change in the static and/or dynamic properties of the geometry of the machine and to update compensation parameters of a model or map of the geometry of the machine which is used to derive the coordinate information from the encoders.

2. The machine state monitoring system according to claim 1, wherein the calibration-monitoring-unit is linked to a numerical compensation unit configured to derive the change in the static or dynamic properties of the geometry of the machine based on a difference in-between at least a first of the optical sensing of the location information of the artifact and at least one second of the optical sensing of the location information of the artifact.

3. The machine state monitoring system according to claim 1, wherein the machine further comprises:
   a machine-base as the first machine portion and a machine head as the second machine portion, and
   wherein the calibration-monitoring-unit is configured to derive the static or dynamic properties of the geometry of the machine with respect to their respective locations at the machine.

4. The machine state monitoring system according to claim 1, wherein
   the calibration-monitoring-unit comprises a location sensing unit which is configured to derive the location information of the artifact in at least three dimensions, wherein the sensing comprises a determination of two lateral locations and of a scaling of the artifact.

5. The machine state monitoring system according to claim 1, wherein
   the calibration-monitoring-unit comprises:
   at least one light source for emitting optical radiation impinging the artifact, and
   at least one photosensitive sensor to optically sense the optical radiation affected by the artifact.

6. The machine state monitoring system according to claim 5, wherein the calibration-monitoring-unit is built to optical sense the artifact based on a positional light intensity profile, derived by the photosensitive sensor which is arranged at a side of the artifact which side is substantially opposite to the side of the light source.

7. The machine state monitoring system according to claim 5, wherein
the calibration-monitoring-unit comprises at least one optical fiber for the emitting or sensing of the optical radiation.

8. The machine state monitoring system according to claim 5, wherein the calibration-monitoring-unit is built to optically sense the artifact based on a positional light intensity profile derived by the photosensitive sensor which is arranged at substantially the same side of the artifact at which the light source is arranged.

9. A machine states monitoring system according to claim 1, wherein the calibration-monitoring-unit comprises a stiffness measurement unit, configured with at least one of:
at least one rigid end stop at the calibration-monitoring-unit to be touched by the artifact, wherein the rigid end stop comprises a force sensor for deriving a force-value in-between the rigid end stop and the artifact,
at least one rigid end stop at the calibration-monitoring-unit to be touched by the artifact, wherein the artifact comprises a force sensor for deriving a force-value in-between the rigid end stop and the artifact, or
an actively movable end stop at the calibration-monitoring-unit to generate defined force value onto the artifact during the sensing of the location information.

10. A method for monitoring changes in static or dynamic properties of a machine geometry of a machine which includes a first machine portion and a second machine portion which are positionable with respect to one another by a motorized drive unit, and positional encoders for deriving a coordinate information of the first machine portion with respect to the second machine portion, wherein the first machine portion includes a calibration monitoring unit fixed to it and wherein the second machine portion is comprising an artifact, the method comprising:
positioning the artifact at a defined monitoring position at the calibration monitoring unit;
optically sensing a location information of the artifact in at least two dimensions;
deriving the changes in the static and/or dynamic properties of the machine geometry by a comparing of the location information with at least one preceding location information of at least one of the recurrent positionings of the artifact; and
updating compensation parameters of a model or map of the geometry of the machine which is used to derive the coordinate information from the encoders according to the derived static or dynamic properties of the machine geometry.

11. The method according to claim 10, further comprising:
storing the location information to a history of location information; and
comparing the location information to a previously stored location information from the history to derive the changes in the static or dynamic properties of the machine geometry, and there from deriving compensation parameters for the deriving of the coordinate information.

12. The method according to claim 10, further comprising applying the compensation parameters to coordinate information derived by the encoders of the machine, resulting in corrected and updated coordinate measurement values at run time of the machine.

13. The method according to claim 10, further comprising:
applying a defined or measured force to the artifact located within a sensing range of the calibration monitoring unit; and
deriving compliance properties of the machine geometry by evaluating the location information together with the force.

14. The method according to claim 10, further comprising dynamically moving the artifact within a sensing range of the calibration monitoring unit, and deriving dynamic properties of the machine geometry by sensing a sequence of location information during the dynamically moving and comparing a desired dynamical movement with the sensed sequence.

15. A computer program product comprising non-transitory transitory program code stored on a machine-readable medium, for monitoring long term changes in the geometry, static and dynamic related properties of a machine, configured for executing a method according to claim 10.

* * * * *